United States Patent
Fuchs et al.

(10) Patent No.: US 12,428,090 B2
(45) Date of Patent: Sep. 30, 2025

(54) RECREATIONAL VEHICLES WITH HEATED COMPONENTS

(71) Applicant: Indian Motorcycle International, LLC, Medina, MN (US)

(72) Inventors: Benjamin S. Fuchs, Nowthen, MN (US); Austin Holt, St. Anthony, MN (US); Corey A. Simonetta, Jr., Almont, MI (US)

(73) Assignee: INDIAN MOTORCYCLE INTERNATIONAL, LLC, Medina, MN (US)

( * ) Notice: Subject to any disclaimer, the term of this patent is extended or adjusted under 35 U.S.C. 154(b) by 0 days.

(21) Appl. No.: 18/753,408

(22) Filed: Jun. 25, 2024

(65) Prior Publication Data
US 2024/0343333 A1   Oct. 17, 2024

Related U.S. Application Data

(60) Division of application No. 18/226,460, filed on Jul. 26, 2023, now Pat. No. 12,054,216, which is a continuation of application No. 16/734,846, filed on Jan. 6, 2020, now Pat. No. 11,760,434.

(60) Provisional application No. 62/789,269, filed on Jan. 7, 2019.

(51) Int. Cl.
*B62J 45/20* (2020.01)
*B62J 43/30* (2020.01)
*H01F 38/14* (2006.01)
*H02J 50/10* (2016.01)

(52) U.S. Cl.
CPC .............. *B62J 45/20* (2020.02); *B62J 43/30* (2020.02); *H01F 38/14* (2013.01); *H02J 50/10* (2016.02)

(58) Field of Classification Search
CPC .. B62J 45/20; B62J 43/30; H02J 50/10; H01F 38/14
USPC ............................................. 701/36
See application file for complete search history.

(56) References Cited

U.S. PATENT DOCUMENTS

| | | |
|---|---|---|
| 1,011,574 A | 12/1911 | Carron |
| 4,609,904 A | 9/1986 | Paine |
| 5,934,748 A | 8/1999 | Faust et al. |
| 6,196,627 B1 | 3/2001 | Faust et al. |
| 6,277,023 B1 | 8/2001 | Schwarz |
| 6,808,230 B2 | 10/2004 | Buss et al. |

(Continued)

FOREIGN PATENT DOCUMENTS

| | | |
|---|---|---|
| CA | 2250610 A1 | 4/1999 |
| JP | 2006-282041 A | 10/2006 |

(Continued)

OTHER PUBLICATIONS

Chinese Office Action dated Aug. 9, 2024 in corresponding Chinese Application No. 202080008388.3.

(Continued)

*Primary Examiner* — Alfonso Perez Borroto
(74) *Attorney, Agent, or Firm* — SCHWEGMAN LUNDBERG & WOESSNER, P.A.

(57) ABSTRACT

A vehicle including a system for transferring energy between on-board vehicle components and/or between on-board and external components. The vehicle is configured to heat various components through induction to provide comfort to the rider and/or to transfer energy for charging one or more vehicle components.

20 Claims, 22 Drawing Sheets

(56) References Cited

U.S. PATENT DOCUMENTS

| | | |
|---|---|---|
| 7,708,626 B2 | 5/2010 | Bargheer et al. |
| 9,550,541 B2 | 1/2017 | Lenton et al. |
| 9,662,962 B2 | 5/2017 | Steinman et al. |
| 9,744,858 B2 | 8/2017 | Hall et al. |
| 10,471,864 B1 | 11/2019 | Tait |
| 10,500,994 B1 | 12/2019 | Dry et al. |
| 10,744,915 B2 | 8/2020 | McElroy et al. |
| 10,753,761 B2 | 8/2020 | Ricci |
| 10,814,736 B2 | 10/2020 | Van Wiemeersch et al. |
| 11,760,434 B2* | 9/2023 | Fuchs .................... H02J 50/402 701/36 |
| 12,054,216 B2* | 8/2024 | Fuchs ...................... H02J 50/90 |
| 2002/0057005 A1 | 5/2002 | Bargheer et al. |
| 2005/0161193 A1 | 7/2005 | McKenzie et al. |
| 2006/0130490 A1 | 6/2006 | Petrovski |
| 2006/0219686 A1 | 10/2006 | Oishi et al. |
| 2006/0279113 A1 | 12/2006 | Pautz |
| 2007/0045292 A1 | 3/2007 | Yamada et al. |
| 2007/0101729 A1 | 5/2007 | Aoki et al. |
| 2007/0257541 A1 | 11/2007 | Browne et al. |
| 2009/0015043 A1 | 1/2009 | Macht et al. |
| 2009/0242539 A1* | 10/2009 | Wassel ................. A63C 11/228 219/211 |
| 2010/0038067 A1 | 2/2010 | Flynn |
| 2010/0186702 A1 | 7/2010 | Yaccarino |
| 2010/0300644 A1 | 12/2010 | Chung |
| 2010/0314191 A1 | 12/2010 | Deckard et al. |
| 2011/0133525 A1 | 6/2011 | Oota |
| 2012/0080911 A1 | 4/2012 | Brykalski et al. |
| 2012/0144844 A1 | 6/2012 | Park et al. |
| 2012/0256450 A1 | 10/2012 | Sahashi |
| 2013/0175874 A1* | 7/2013 | Lou .......................... H04B 5/79 307/104 |
| 2013/0232996 A1 | 9/2013 | Goenka et al. |
| 2013/0299128 A1 | 11/2013 | Bergamini |
| 2014/0179212 A1 | 6/2014 | Space et al. |
| 2014/0327320 A1* | 11/2014 | Muhs ....................... A43B 3/38 307/104 |
| 2015/0274049 A1 | 10/2015 | Langensiepen et al. |
| 2015/0318732 A1 | 11/2015 | Heine et al. |
| 2016/0009206 A1 | 1/2016 | Perraut et al. |
| 2016/0172870 A1* | 6/2016 | Blum ..................... H02J 50/12 320/108 |
| 2016/0262924 A1 | 9/2016 | Abreu |
| 2016/0272038 A1 | 9/2016 | Tanaka et al. |
| 2016/0304013 A1 | 10/2016 | Wolas et al. |
| 2016/0318468 A1 | 11/2016 | Ricci |
| 2016/0332549 A1 | 11/2016 | Marquette et al. |
| 2016/0347218 A1 | 12/2016 | Akaike et al. |
| 2017/0034157 A1 | 2/2017 | Johansson et al. |
| 2017/0085297 A1* | 3/2017 | Gao ....................... H02J 50/20 |
| 2017/0094727 A1 | 3/2017 | Saunamaki |
| 2017/0144571 A1 | 5/2017 | Chiba |
| 2017/0164757 A1 | 6/2017 | Thomas et al. |
| 2017/0173345 A1* | 6/2017 | Abiri ...................... H02J 50/50 |
| 2017/0274951 A1 | 9/2017 | Xicola Serrano et al. |
| 2017/0334263 A1 | 11/2017 | Schumacher et al. |
| 2017/0341549 A1 | 11/2017 | Da Costa et al. |
| 2018/0065524 A1 | 3/2018 | Bauer et al. |
| 2018/0122568 A1* | 5/2018 | Weber .................... H02J 50/12 |
| 2018/0216780 A1 | 8/2018 | Oltmans |
| 2018/0219403 A1* | 8/2018 | Schneider ............. H02J 50/402 |
| 2018/0354383 A1 | 12/2018 | Namou et al. |
| 2019/0047449 A1 | 2/2019 | Fujii et al. |
| 2019/0061574 A1 | 2/2019 | Schwintek et al. |
| 2019/0077228 A1 | 3/2019 | Goto |
| 2019/0152362 A1 | 5/2019 | Kondo et al. |
| 2019/0289929 A1 | 9/2019 | Bessette et al. |
| 2019/0337429 A1 | 11/2019 | McElroy et al. |
| 2019/0344043 A1 | 11/2019 | Migneco et al. |
| 2019/0366799 A1 | 12/2019 | Czerwonka et al. |
| 2020/0093635 A1 | 3/2020 | Kakizaki et al. |
| 2020/0108753 A1 | 4/2020 | Fujii et al. |
| 2020/0122613 A1 | 4/2020 | McElroy et al. |
| 2020/0216133 A1 | 7/2020 | Rafferty et al. |
| 2020/0223292 A1 | 7/2020 | Kazyak et al. |
| 2021/0039791 A1 | 2/2021 | Wilson et al. |
| 2021/0102733 A1 | 4/2021 | Stahl et al. |

FOREIGN PATENT DOCUMENTS

| | | |
|---|---|---|
| JP | 2007-76550 A | 3/2007 |
| JP | 2010-58674 A | 3/2010 |
| JP | 2016124397 A | 7/2016 |
| WO | WO-2016025776 A1 | 2/2016 |

OTHER PUBLICATIONS

International Search Report for International Application PCT/US2018/047978; Mailed Dec. 12, 2018.

Japanese Office Action dated Aug. 31, 2022 in corresponding Japanese Application No. 2021-562928.

Akkinepally, Gopi, "Bi-Directional Communications Enhance Wireless Power Devices", Jul. 27, 2021, 2 pages.

European Office Action dated Sep. 22, 2022 in corresponding European Application No. 20 703 603.9 (7 pages).

Akkinepally, Gopi, "Bi-Directional Communications Enhance Wireless Power Devices", Jul. 27, 2021, 4 pages.

Canadian Office Action dated Nov. 3, 2023 in corresponding Canadian Application No. 3169443.

* cited by examiner

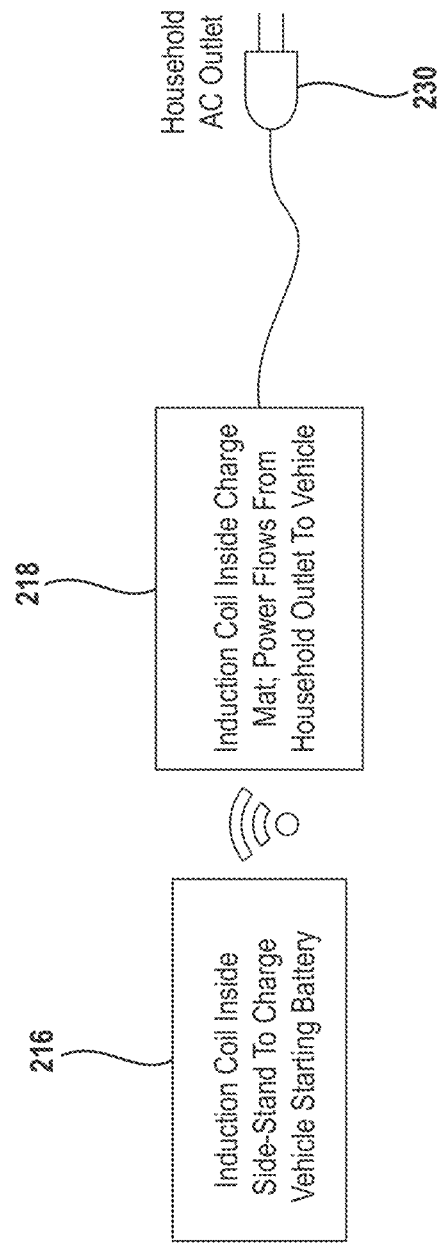

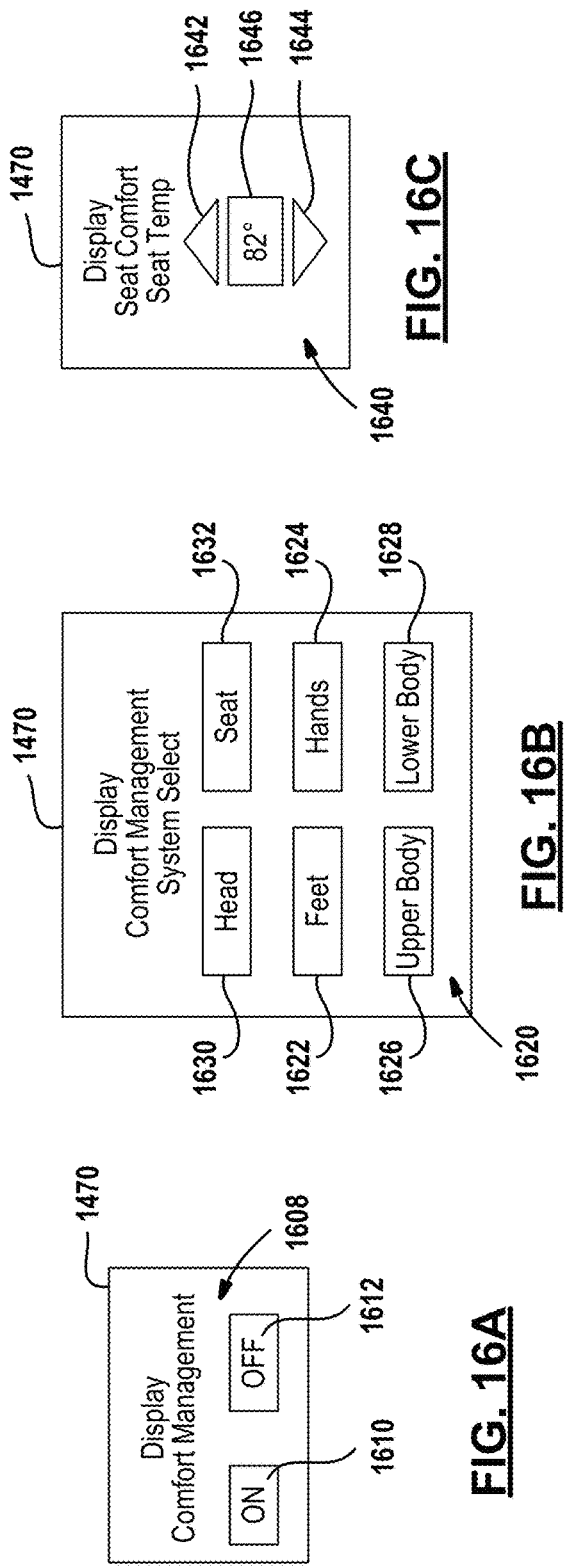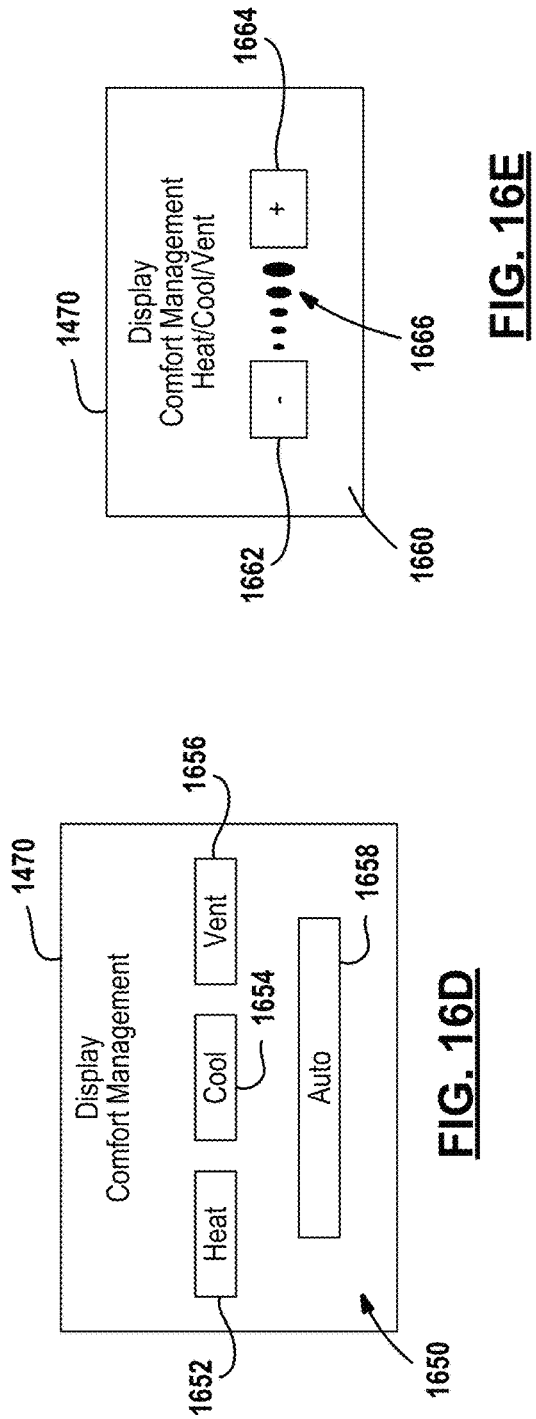

RECREATIONAL VEHICLES WITH HEATED COMPONENTS

CROSS-REFERENCE TO RELATED APPLICATIONS

This application is a divisional of U.S. application Ser. No. 18/226,460, filed Jul. 26, 2023, which is a continuation of U.S. application Ser. No. 16/734,846 filed Jan. 6, 2020, which claims the benefit of U.S. Ser. No. 62/789,269 filed on Jan. 7, 2019. This application is related to U.S. application Ser. No. 16/735,077 filed on Jan. 6, 2020 filed on Jan. 6, 2020. The entire disclosures of the above application is incorporated herein by reference.

FIELD

The present disclosure relates to systems and methods for a vehicle, and in particular to systems and methods for wirelessly transferring power to components on and/or off of the vehicle (e.g., heated handgrips, seats and/or user garments).

BACKGROUND

Vehicles may be open-air vehicles that do not include a roof and/or outer housing. As the ambient temperature surrounding the vehicle decreases, the user of the vehicle may get colder. As such, to provide additional comfort to the user, heated features may be provided. However, the heated features may include many wired connections and/or additional heated components. For example, a heated garment or article may include battery packs, controllers, and/or other wired components to provide heat to the user. Adding these components to the heated garment may make it more cumbersome for the user to operate the vehicle.

Further, in some examples, off-road and on-road vehicles may include a steering system with one or more steering inputs, such as handlebars and/or handgrips. The handgrips may be heated using wires and/or other circuitry connected to a controller and/or a battery. However, the wires may wear down as a user continuously rotates the handgrips to operate the two-wheeled vehicle. Eventually, the user may need to replace the wires and/or handgrips to prevent malfunction of the heated feature for the handgrips.

Also, to charge a battery of the vehicle, a user may need to physically plug the vehicle into a charging source via a wired connection. This may provide an additional hassle to the user, especially if the vehicle is not driven daily. Additionally, providing a wired connection requires multiple different charging components and/or steps to charge the vehicle. Accordingly, there exists a need for one or more improved methods or systems in order to address one or more of the above-noted drawbacks.

SUMMARY

In an exemplary example of the present disclosure, a method for providing current to energy transfer devices is provided. For example, a controller receives user input indicating a temperature setting, determines, based on the temperature setting, an amount of current to provide to a first energy transfer device, wherein the first energy transfer device is operatively coupled to a frame of a recreational vehicle, and provides, based on the determined amount of current and by the controller, a current to the first energy transfer device. The first energy transfer device is configured to wirelessly provide power to a second energy transfer device, and the second energy transfer device is configured to provide the power to a load.

In some instances, the first energy transfer device is a first inductive coil. The second energy transfer device is a second inductive coil. The first inductive coil is configured to wirelessly provide the power to the second inductive coil based on inducing a second current. In some examples, the recreational vehicle comprises a steering assembly having a handgrip. The first inductive coil and the second inductive coil are located on an interior portion of the handgrip. In some variations, the load is an article worn by the user. The load comprises a climate control element corresponding to the article. The second inductive coil is operatively coupled to the article and configured to provide the second current to the heating element to control a climate of the article.

In some instances, the first energy transfer device is a first conductive material and the second energy transfer device is a second conductive material. The first conductive material provides a conductive current to the second conductive material based on a physical contact between the first conductive material and the second conductive material. In some examples, the load is an article worn by the user and the load comprises a heating element corresponding to the article. The second conductive material is operatively coupled to the article and configured to provide the current to the climate control element to control a climate of the article.

In some variations, the second energy transfer device is operatively coupled to a contact point between the recreational vehicle and an operator. In some instances, the controller receives, from at least one sensor, sensor information. The controller determines the amount of current to provide to the first energy transfer device is based on the sensor information. In some examples, the at least one sensor comprises a vehicle speed sensor, and the sensor information comprises information indicating a vehicle speed. In some variations, the at least one sensor comprises a battery voltage sensor, and the sensor information comprises information indicating a battery voltage. In some instances, the at least one sensor comprises an ambient temperature sensor, and the sensor information comprises information indicating an ambient temperature.

In some examples, the load comprises a body temperature sensor, the at least one sensor comprises radio frequency receiver, and the sensor information comprises information indicating a body temperature of a user. In some variations, the controller increases the amount of current to provide the first energy transfer device in response to the body temperature of the user being less than a temperature corresponding to the temperature setting. In some instances, the controller decreases the amount of current to provide the first energy transfer device in response to the body temperature of the user being greater than a temperature corresponding to the temperature setting.

In another exemplary example of the present disclosure, a recreational vehicle is provided. The recreational vehicle includes a frame, front and rear ground-engaging members supporting the frame, a powertrain drivingly coupled to one of the front and rear ground-engaging members, a steering assembly coupled to the front ground-engaging member for steering the vehicle, the steering assembly comprising a steering portion having a user grip or steering wheel, wherein the steering portion comprises a first inductive coil, and wherein the user grip or steering wheel comprises climate control circuitry comprising a second inductive coil, and at least one programmable controller operatively coupled to the first inductive coil and configured to control a temperature of the user grip or steering wheel by providing a current to the first inductive coil. The first inductive coil wirelessly transfers the current to the second inductive coil and the second inductive coil causes the temperature of the user grip or steering wheel to change.

In some instances, the vehicle further comprises a user input device operatively coupled to the frame and configured to provide user input indicating a temperature setting to the at least one programmable controller. The at least one programmable controller is configured to control the temperature of the user grip or steering wheel based on the user input indicating the temperature setting. In some examples, the user input device is at least one of: an analog temperature selector, a touch screen, and a digital input device. In some variations, the vehicle further comprises at least one sensor operatively coupled to the frame and configured to provide sensor information to the at least one programmable controller. The at least one programmable controller is configured to control the temperature of the user grip based on the sensor information.

In some instances, the first inductive coil wirelessly transfers the current to the second inductive coil based on a separation between the first inductive coil and the second inductive coil. In some examples, the first inductive coil is positioned radially around a first axis, the second inductive coil is positioned radially around the first axis, and the separation is a distance along the first axis. In some variations, the vehicle further comprises a battery operatively coupled to the frame, and a high frequency inverter electrically coupled to the battery. The high frequency inverter is configured to convert a direct current (DC) from the battery to an alternating current (AC), and the current to the first inductive coil is the alternating current from the high frequency inverter.

In another exemplary example of the present disclosure, a vehicle control system is provided. The vehicle control system includes a vehicle and an article worn by a user. The vehicle includes a frame, front and rear ground-engaging members supporting the frame, a powertrain drivingly coupled to one of the front and rear ground-engaging members, a battery operatively coupled to the frame, a first energy transfer device supported by the frame, and at least one programmable controller electrically coupled to the battery and the first energy transfer device configured to provide a current to the first energy transfer device. The article worn by the user comprises heating circuitry comprising a second energy transfer device configured to receive the current from the first energy transfer device and heating elements operatively coupled to the second energy transfer device and configured to control a temperature of the article worn by the user using the current from the second energy transfer device.

In some instances, the vehicle further comprises a user input device operatively coupled to the frame and configured to provide user input indicating a temperature setting to the at least one programmable controller. The at least one programmable controller is configured to provide the current to the first energy transfer device based on the user input indicating the temperature setting. In some examples, the vehicle further comprises at least one sensor operatively coupled to the frame and configured to provide sensor information to the at least one programmable controller. The at least one programmable controller is configured to provide the current to the first energy transfer device based on the sensor information.

In some instances, the vehicle further comprises a steering assembly coupled to the front ground-engaging member for steering the vehicle and the steering assembly comprising a steering portion having a user grip. The user grip comprises the first energy transfer device and the article worn by the user is a glove. In some examples, the first energy transfer device is a first conductive material, and the second energy transfer device is a second conductive material. In some variations, the vehicle further includes a floorboard operatively coupled to the frame. The floorboard is operatively coupled to the first energy transfer device, and the article worn by the user is a boot. In some instances, the first energy transfer device is a first inductive coil, and the second energy transfer device is a second inductive coil.

In another exemplary example of the present disclosure, a vehicle charging system is provided. The vehicle control system includes a vehicle and a charging device. The vehicle includes a frame, front and rear ground-engaging members supporting the frame, a powertrain drivingly coupled to one of the front and rear ground-engaging members, and a battery operatively coupled to the frame. The charging device comprises an outlet component operatively coupled to an electrical outlet and configured to provide a current and a second energy transfer device operatively coupled to the outlet component and configured to receive the current from the outlet component. The second energy transfer device transfers the current to the first energy transfer device, and the first energy transfer device is configured to provide the current to the battery to charge the battery.

In one aspect of the disclosure, a seat assembly for a vehicle having a longitudinal axis has a seat pan, a cover support adjacent to the seat pan and a seat cover comprising an upper surface and a first longitudinally extending side surface and a second longitudinally extending side surface. A heating and cooling module is disposed at least partially within the cover support. An air inlet is in communication with the heating and cooling module. The air inlet communicates air from a port in the seat cover to the heating and cooling module. An ambient condition sensor generates an ambient condition signal. A user interface generates a user setting corresponding to a comfort condition. A controller is coupled to the ambient condition sensor and the heating and cooling module. The controller controls the heating and cooling module in response to the user setting and the ambient condition signal.

In a further aspect of the disclosure, method of controlling a seat includes generating ambient condition signal from an ambient condition sensor, generating an occupant condition signal from an occupant condition sensor, generating a user setting corresponding to a comfort condition at a user interface, and controlling a heating and cooling module in response to the user setting and the ambient condition signal.

In some instances, the charging device is a charging mat or a docking station. In some examples, the first energy transfer device is a first inductive coil and the second energy transfer device is a second inductive coil. In some variations, the first energy transfer device is first conductive material and the second energy transfer device is a second conductive material.

Additional features of the present disclosure will become apparent to those skilled in the art upon consideration of the following detailed description of illustrative examples exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings, where:

FIG. 13A shows an example of recharging an energy source of the vehicle control system.

FIGS. 16A-16I are screen displays of various screens in the control of the comfort management system.

DETAILED DESCRIPTION

Figure 1:
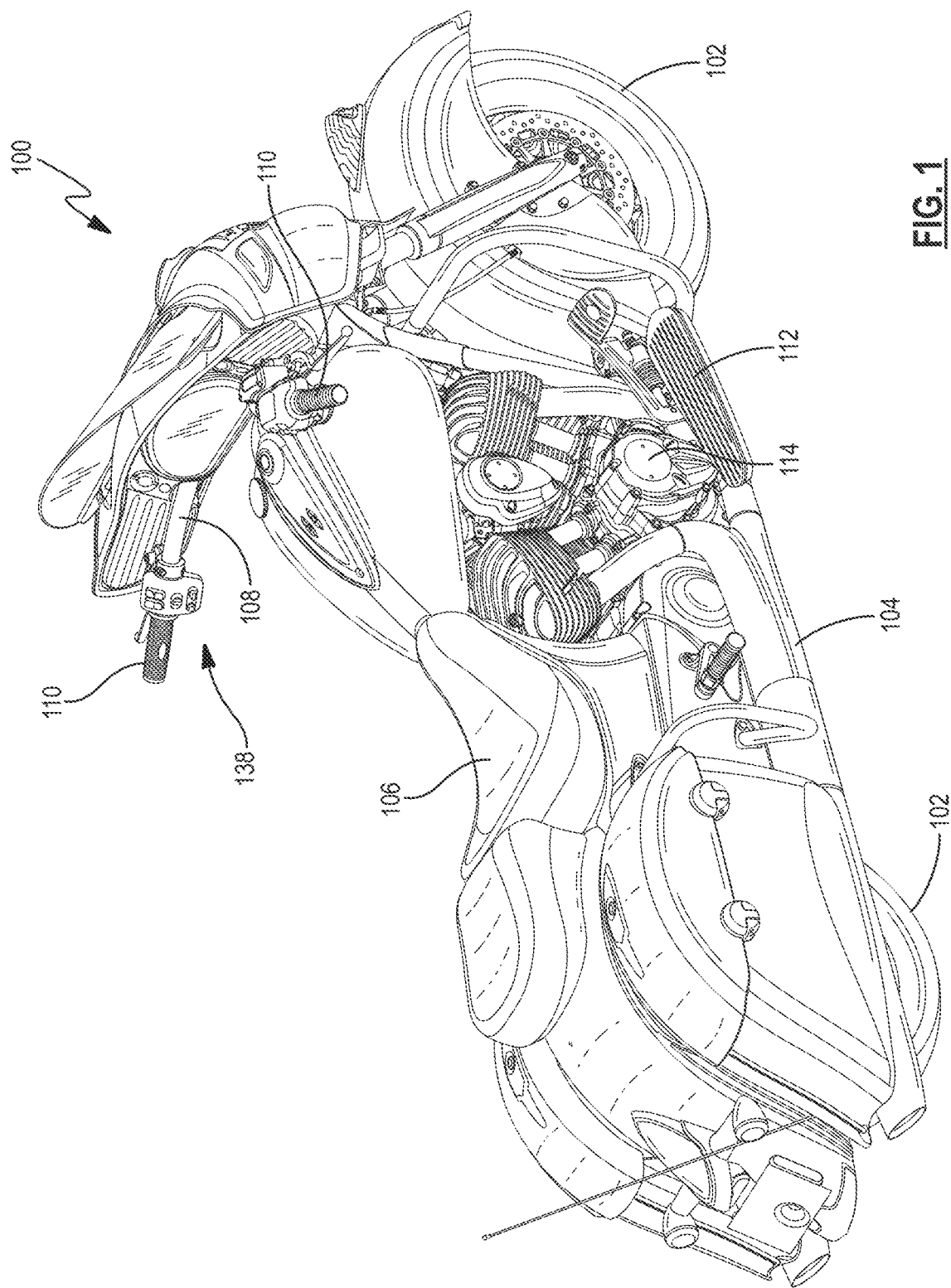
FIG. 1 is a rear, right perspective view of a vehicle of the present disclosure.

For the purposes of promoting an understanding of the principles of the present disclosure, reference will now be made to the examples illustrated in the drawings, which are described below. The examples disclosed below are not intended to be exhaustive or limited to the precise form disclosed in the following detailed description. Rather, the examples are chosen and described so that others skilled in the art may utilize their teachings.

Although a heating of a heating element is described, a cooling element or ventilation element may transfer energy to change the environment of a device whether it be heating, cooling, or ventilation.

FIG. 1 shows one type of a recreational vehicle 100, such as a two-wheeled vehicle. However, in examples, the vehicle 100 may be any vehicle, such as a two-wheel vehicle, a three-wheel vehicle, a four-wheel vehicle, and/or other types of recreational vehicles that may used on roads, trails, and/or both. Some examples of the recreational vehicle 100 include, but are not limited to, motorcycles, all-terrain vehicles (ATVs), side-by-side recreational vehicles, snowmobiles, and utility vehicles.

Additional details regarding the examples of the recreational vehicle 100 are provided in U.S. Pat. No. 8,827,019 (filed Dec. 18, 2013, titled SIDE-BY-SIDE VEHICLE), U.S. Pat. No. 9,211,924 (filed Mar. 25, 2014, titled SIDE-BY-SIDE VEHICLE), U.S. Pat. No. 8,544,587 (filed Mar. 21, 2012, titled THREE-WHEELED VEHICLE), U.S. application Ser. No. 15/387,504 (filed Dec. 21, 2016, titled TWO-WHEELED VEHICLE), U.S. Pat. No. 9,738,134 (filed Jun. 23, 2016, titled UTILITY VEHICLE), and U.S. Pat. No. 9,809,195 (filed Nov. 22, 2013, titled SNOWMOBILE), all assigned to the present assignee, the entire disclosures of which are expressly incorporated by reference herein.

As shown in FIG. 1, the recreational vehicle 100 includes a plurality of ground engaging members 102. Illustrative ground engaging members 102 include wheels, treads, skis, and other suitable devices which support the vehicle 100 relative to the ground. The recreational vehicle 100 further includes a frame 104 supported by the plurality of ground engaging members 102.

The front and/or rear wheels 102 are coupled to a powertrain assembly 114, to propel the vehicle 100 during operation thereof. Powertrain assembly 114 includes both an engine and a transmission. The transmission is coupled to the engine and provides power to the front and/or rear wheels 102.

A seat 106 is operatively supported by the frame 104. The illustrative seats 106 include straddle seats, bench seats, bucket seats, and other suitable support members. In addition to the seat 106, the recreational vehicle 100 may further include a passenger seat. Illustrative passenger seats include straddle seats, bench seats, bucket seats, and other suitable support members. In some instances, the passenger seat is positioned directly rearward of the user seat. One or more floorboards 112 are supported by the frame 104. The vehicle floorboards 112 are adapted to support a lower portion of the user when the user is operating the vehicle 100. For example, when a user is sitting on the seat 106, the user may place their shoes, boots, and/or other accessories on the floorboards 112.

The recreational vehicle 100 further includes a steering system 138. The steering system 138 is coupled to at least one of the ground engagement members 102 and generally includes a user input or steering member 108 adapted to be grasped by a user of the vehicle 100. The illustrative steering members 108 include handlebars and/or steering wheels. Additionally, and/or alternatively, the steering member 108 includes one or more user grips 110. An illustrative user grip 110 is a handgrip (e.g., a motorcycle handgrip).

Figure 2:
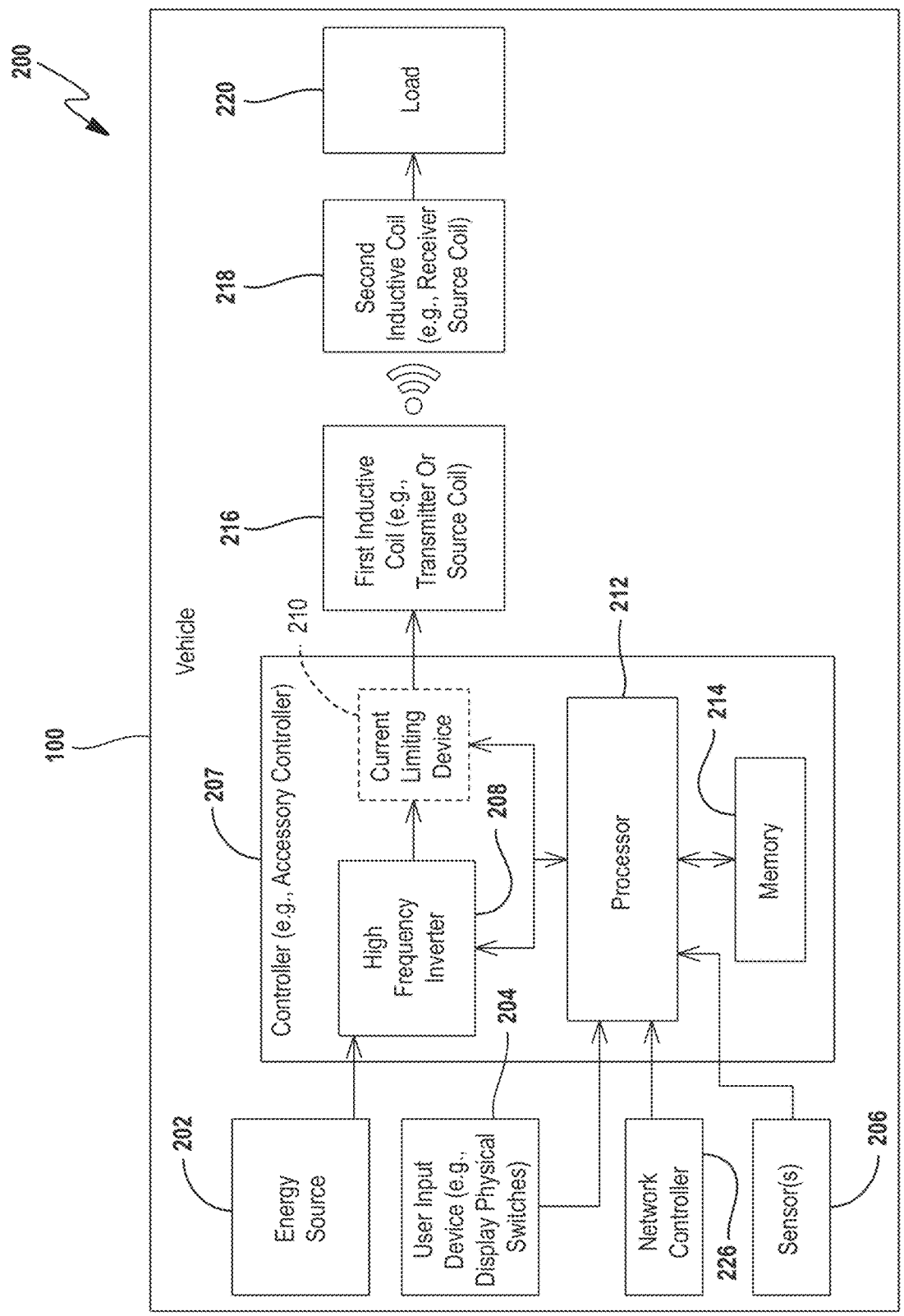
FIG. 2 shows a block diagram of a vehicle control system with inductive coils.
Figure 3:
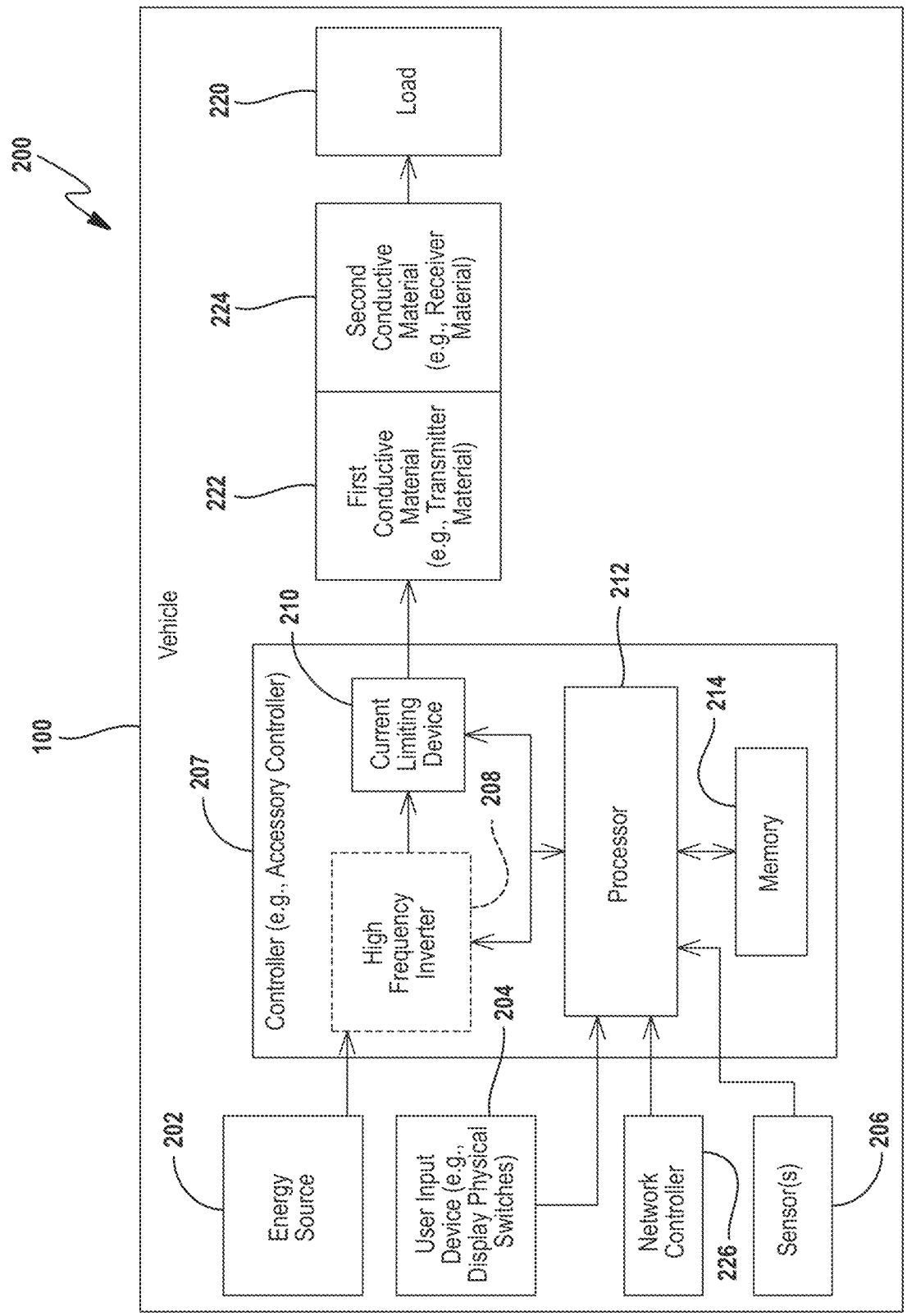
FIG. 3 shows a block diagram of a vehicle control system with conductive materials.

FIGS. 2-5 show illustrative block diagrams of a vehicle control system 200, such as a vehicle control system 200 and/or a vehicle energy source charging system. Referring to FIGS. 2 and 3, the vehicle 100 includes components, subsystems, and/or devices of the vehicle control system 200. For example, the vehicle control system 200 and/or the vehicle 100 includes an energy source 202, a user interface 204, one or more sensor 206, a controller (e.g., an accessory controller) 207, a network controller 226, a high frequency inverter 208, a current limiting circuitry 210, a processor 212, a memory 214, a first energy transfer device (e.g., a first inductive coil 216 as shown in FIG. 2 and/or a first conductive material 222 as shown in FIG. 3), a second energy transfer device (e.g., a second inductive coil 218 as shown in FIG. 2 and/or a second conductive material 224 as shown in FIG. 3), and/or a load 220. The load 220 may be a heating, cooling, or ventilation device.

Figure 4:
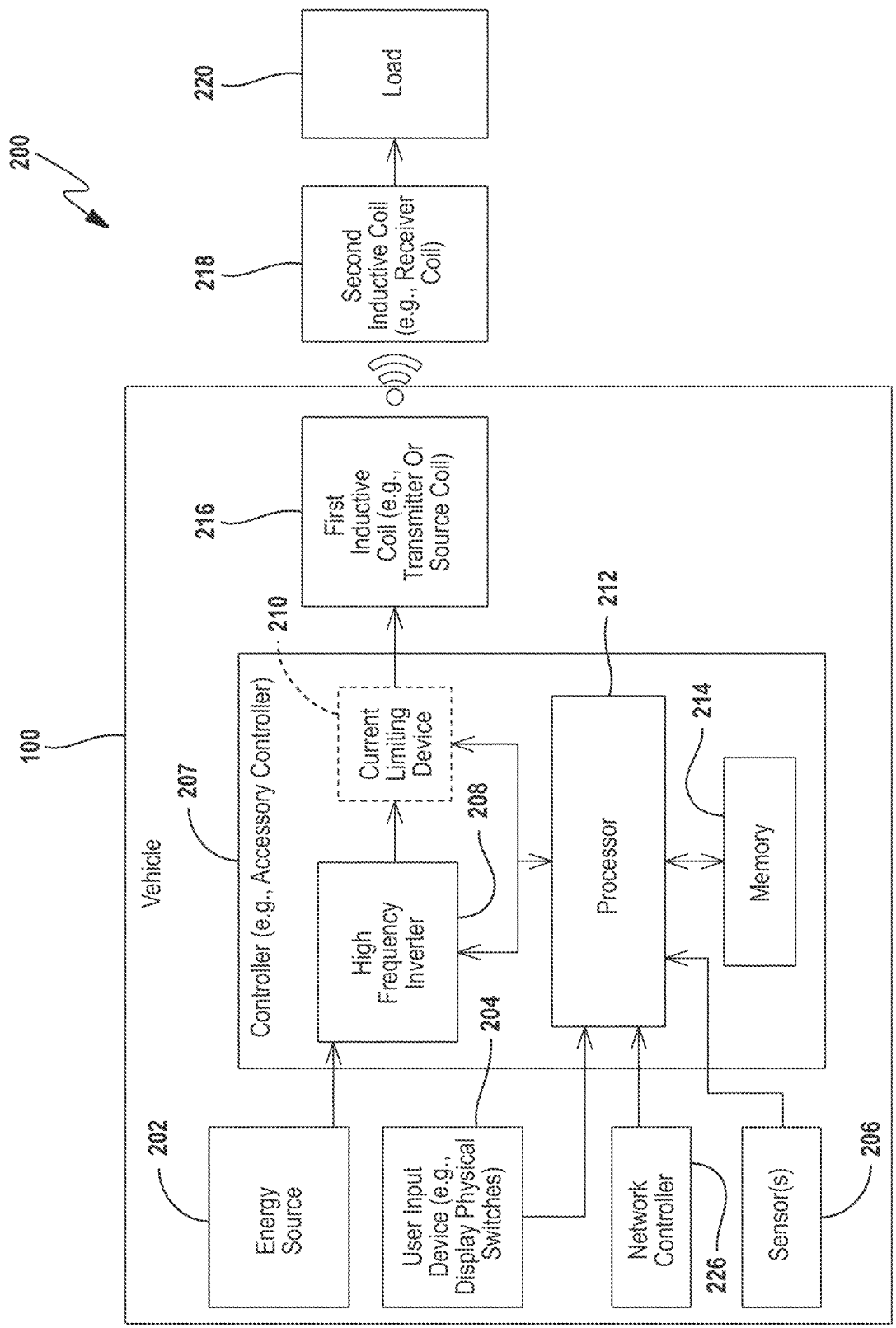
FIG. 4 shows another block diagram of a vehicle control system with inductive coils.
Figure 5:
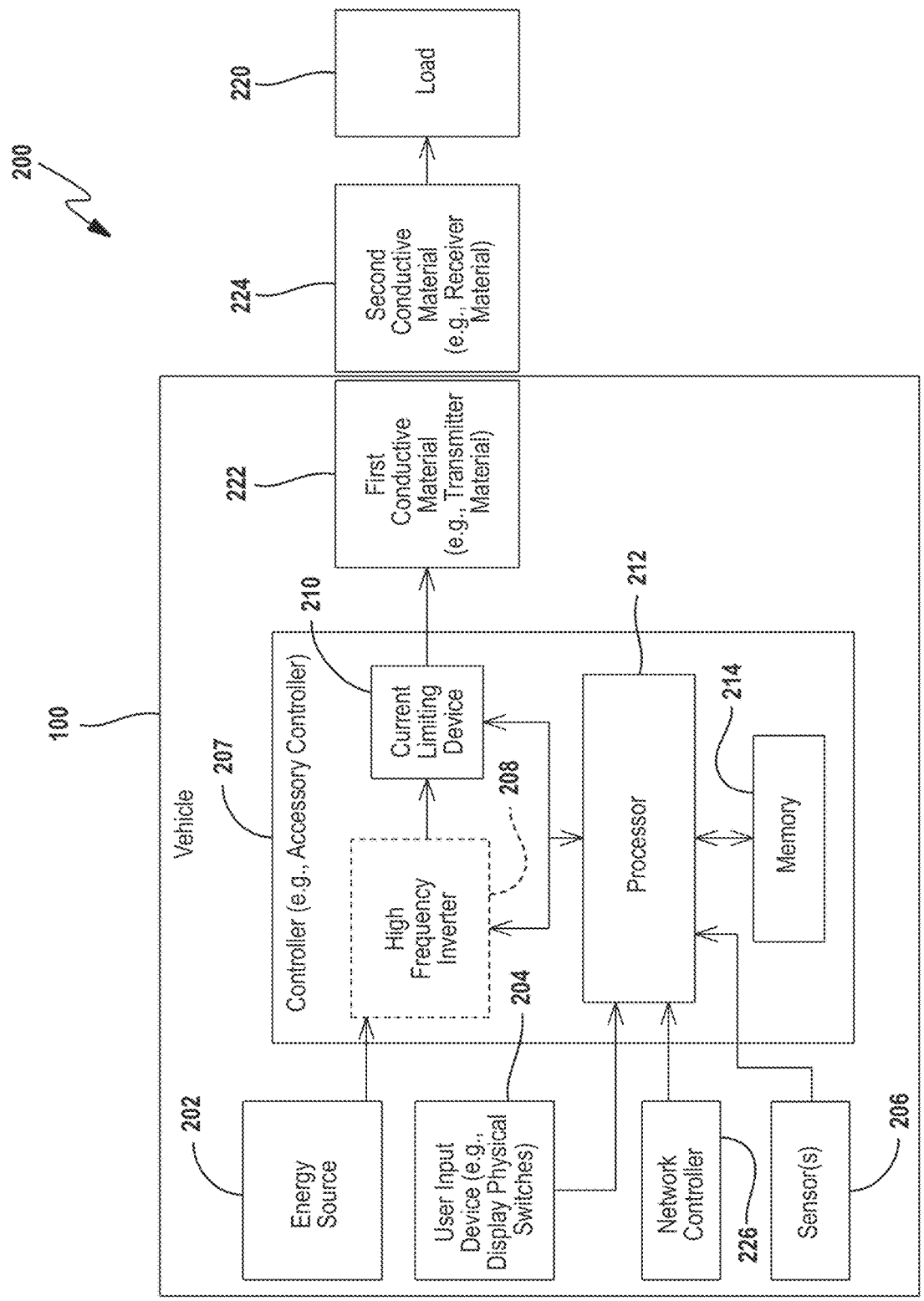
FIG. 5 shows another block diagram of a vehicle control system with conductive materials.

Referring to FIGS. 4 and 5 and in some examples, the vehicle 100 does not include some components, sub-systems, and/or devices of the vehicle control system 200, such as the second energy transfer device (e.g., a second inductive coil 218 as shown in FIG. 4 and/or a second conductive material 224 as shown in FIG. 5) and/or the load 220, and rather, those components or systems are external to vehicle 100. In some examples and as will be described below, the second inductive coil 218, the second conductive material 224, and/or the load 220 are included within a second component and/or system external to the vehicle 100, such as an article worn by a user (e.g., jackets, shirts, coats, pants, shoes, boots, helmets, gloves, shorts, and/or other types of wearable objects/clothing/garments) and/or a charging sub-system or device (e.g., a charging mat, a charging puck, stand, and/or other types of charging devices).

Referring to FIGS. 2 and 4, the current limiting device 210 is optional. When present, the current limiting device 210 assists the high frequency inverter 208 in limiting the current, voltage, and/or power from the energy source 202 to the first inductive coil 216. Referring to FIGS. 3 and 5, the high frequency inverter 208 is optional. When present, the high frequency inverter 208 assists the current limiting device 210 in limiting the current, voltage, and/or power from the energy source 202 to the first conductive material 222. The high frequency inverter 208 and the current limiting device 210 will be described in further detail below.

Referring to FIGS. 2-5, the vehicle control system 200 includes at least one energy source (e.g., batteries, stators, regulators, ferrous cores, and/or other types of energy sources) 202. The energy source 202 provides power (e.g., 12 or 14 Volts) to one or more components, devices, and/or sub-systems of the vehicle control system 200. In some examples, the energy source 202 provides power to one or more energy transfer devices (e.g., energy transfer circuitry), such as the first inductive coil 216, the second inductive coil 218, the first conductive material 222, and/or the second conductive material 224. Additionally, and/or alternatively, the energy source 202 of the vehicle 100 provides power to a second component and/or system, such as the load 220 in an article worn by a user.

The user input device 204 includes one or more digital input devices (e.g., switches on the steering members 108 and/or voice command devices), physical switches, push buttons, levers, knobs, hard keys, soft keys, temperature selectors (e.g., analog or digital), user interfaces (e.g., displays and/or touch screens), and/or other types of devices capable of receiving user input from a user. Additionally, and/or alternatively, the user input device 204 is a voice command device, such as a headset and/or a microphone array. For example, the user may provide voice commands using the headset and/or microphone array. The headset and/or microphone array provides the voice commands (e.g., one or more temperature settings) to the processor 212.

The network controller 226 controls communications between recreational vehicle 100 and other devices using one or more network components. In some instances, network controller 226 of recreational vehicle 100 communicates with paired devices over a wireless network (e.g., via a wireless or WiFi chip). An illustrative wireless network is a radio frequency network utilizing a BLUETOOTH protocol. In this example, the network controller 226 is operatively coupled to and/or includes a radio frequency antenna. Network controller 226 controls the pairing of devices, other recreational vehicles, and/or servers to recreational vehicle 100 and the communications between recreational vehicle 100 and the remote devices or other recreational vehicles. Further, the network controller 226 communicates with the controller 207, such as receiving information from the processor 212 and/or providing information to the processor 212.

The vehicle control system 200 is configured to transfer energy between on-board vehicle components and/or between on-board components and external components. For example, in one example, the vehicle control system 200 is configured to provide energy transfer in the form of heat energy to various vehicle components to increase the comfort of the rider, especially when the rider or user is operating the vehicle 100 in colder weather and due to the open-air nature of vehicle 100. More particularly, the vehicle control system 200 may be configured to provide heat energy to the handgrips 110, the articles/garments worn by the user, and any other component on the vehicle 100 that is in contact with and/or in proximity of the user. In addition to heat transfer, the vehicle control system 200 is configured to provide alternative energy transfer to vehicle components using external sources. For example, in such instances, the vehicle control system 200 may be configured to wirelessly charge vehicle components through energy transfer between an external charging stand, station, mat, puck, or other similar device and a vehicle component, such as the energy source 202. Additional disclosure of these functions of the vehicle control system 200 is disclosed herein.

Vehicle Control System Configured for Heating

Using the vehicle system 200 and/or the method 300 described below in FIG. 6 to heat various components may be useful for "twist throttle" instances (e.g., twisting of the user grips 110). For example, by using the inductive coils 216 and 218, wire fatigue issues may be reduced and/or eliminated. This may also remove corrosion concerns since the components may be formed of thermoplastic elastomers (TPE) or another soft rubber-based material. In other words, by using inductive coils in the handgrips, there may be little or no component fatigue, corrosion issues, and/or connections for a customer to install.

Further, by using inductive and/or conductive power transfer to heat articles worn by the user, the articles may be heated beyond the surface of the article and/or provide better heating to the user. The articles do not need an onboard power source, such as batteries and/or a controller that can add weight, bulk, or a cord to power the article. In other words and as will be described below in FIGS. 11-13, by using the vehicle energy source 202, the garments of the user can be heated such that many heating components from the garments may be removed.

Referring to using the vehicle control system 200 to heat various components, the user input device 204 may be configured to control a temperature of one or more components and/or systems in the vehicle control system 200. For example, in examples of FIGS. 1-5, the user input device 204 may be provided on a portion of the steering members 108 and/or the handgrips 110 such that any inputs (e.g., switches, buttons, levers, etc.) are configured to receive a user input. In some instances, the physical switches of user input device 204 may cause a temperature increase or decrease of the vehicle handgrips 110. Additionally, and/or alternatively, the physical switches may cause a temperature increase or decrease of the article worn by the user. In some examples, the user input device 204 includes a touch screen display and the controller 207 interprets various types of touches to the touch screen display as inputs and controls the content displayed on touch screen display. This will be described in further detail below.

The sensor(s) 206 includes one or more sensors and/or devices that detect, determine, monitor and/or provide sensor information indicating various parameters of the vehicle 100 or the environment surrounding the vehicle 100. The types of sensors and/or operations of sensors will be described below.

The controller 207 (e.g., an accessory controller and/or a controller for the steering assembly 138) includes one or more processors (e.g., processor 212), the memory (e.g., memory 214), the high frequency inverters 208, and/or the current limiting device 210. The controller 207 may be a single device or a distributed device, and the functions of the controller 207 (e.g., processor 212) may be performed by hardware and/or as computer instructions on a non-transient computer readable storage medium, such as the memory 214. In some instances, the controller 207 forms a portion of a processing subsystem including one or more computing devices having memory, processing, and communication hardware. The controller 207 may alternatively include one or more application-specific integrated circuits (ASICs), field-programmable gate arrays (FPGAs), digital signal processors (DSPs), hardwired logic, or combinations thereof.

The memory 214, is computer-readable medium in the form of volatile and/or nonvolatile memory and is removable, nonremovable, a combination, and/or non-transitory. Computer-readable medium examples include Random Access Memory (RAM), Read Only Memory (ROM), Electronically Erasable Programmable Read Only Memory (EEPROM), flash memory, optical or holographic media, magnetic storage devices, and/or any other medium that can be used to store information and can be accessed by an electronic device, such as the processor 212. Additionally, and/or alternatively, the memory 214 is representative of multiple memories.

Referring to FIGS. 2-5, when present, the high frequency inverter(s) 208 is any type of circuitry that converts between DC current and alternating current (AC). For example, the energy source 202 provides DC current to the controller 207. A first energy transfer device (e.g., the first inductive coil 216 and/or the first conductive material 222) may use AC current to transfer energy to a second energy transfer device (e.g., the second inductive coil 218 and/or the second conductive material 224). The high frequency inverter 208 converts the DC current from the energy source 202 to the AC current and provides the AC current to the current limiting circuitry 210 and/or the first energy transfer device.

When present, the current limiting device 210 includes one or more devices and/or circuitry that limits the current provided to the energy transfer devices. For example, the current limiting device 210 is any type of circuitry and/or device that limits the current, power, and/or voltage. The current limiting device 210 is operatively coupled to the processor 212. The processor 212 provides signals, instructions, and/or other indications to the current limiting device 210 to limit the current output to the first and second energy transfer devices.

In some variations, the current limiting device 210 is included within the high frequency inverter 208. For instance, referring to FIGS. 2 and 4, the high frequency inverter 208 converts the DC current to the AC current and limits the current and/or voltage based on instructions from the processor 212. After converting and/or limiting the current, the high frequency inverter 208 provides the current to the first energy transfer device, such as the first inductive coil 216.

In some examples and as mentioned above, the high frequency inverter 208 is optional. For example, referring to FIGS. 3 and 5, when present, the high frequency inverter 208 converts the DC current to the AC current and provides the current to the current limiting device 210. When absent, the energy source 202 provides the DC current to the current limiting device 210. Based on instructions from the processor 212, the current limiting device 210 limits the current and/or voltage and provides the output to the first energy transfer device, such as the first conductive material 222. In some instances, the current limiting device 210 is a buck converter (e.g., a DC to DC converter) and/or a slip ring.

The controller 207 is operatively coupled to, communicates with, and/or controls the devices, components, and/or sub-systems of the vehicle 100. For example, the controller 207 communicates with the energy source 202, the user input device 204, and/or the sensors 206. In some instances, the controller 207 receives a current from the energy source 202. The current may be a DC current. The high frequency inverter 208 converts the DC current to AC current and provides the AC current to the current limiting device 210.

In some examples, the controller 207 (e.g., processor 212) receives user input from the user input device 204. In some variations, the controller 207 (e.g., processor 212) receives sensor information from the sensors 206. In some instances, based on the sensor information and/or the user input, the controller 207 (e.g., processor 212) provides and/or limits the current to one or more energy transfer devices. For example, the processor 212 provides a signal to the current limiting device 210 to provide and/or limit the current to the energy transfer devices. In other words, to provide power to the heated handgrips and/or articles worn by the user, the processor 212 may control, monitor, and/or manage the operation of the transfer of energy between the vehicle 100 and the components of the vehicle 100 (e.g., the handgrips 110) and/or between the vehicle 100 and the components exterior to the vehicle 100 (e.g., the articles worn by the user).

In some variations, the controller 207 is an accessory controller that controls operations for the vehicle 100. In other variations, the controller 207 is a controller for the steering assembly 138, such as a switch cube controller. For example, the controller 207 includes one or more controllers within the steering assembly 138, such as one or more controller within the steering member 108. The controllers may receive information (e.g., user input and/or sensor information), and provide power to control a temperature of a load 220, such as the user grips 110). The operation of the controller 207 and/or processor 212 will be described in further detail below.

The illustrative vehicle control system 200 and/or the vehicle 100 is not intended to suggest any limitation as to the scope of use or functionality of examples of the present disclosure. Neither should the illustrative vehicle control system 200 and/or the vehicle 100 be interpreted as having any dependency or requirement related to any single component and/or system or combination of components and/or systems illustrated therein. Additionally, various components and/or systems depicted in FIGS. 1-5, in examples, may be integrated with various ones of the other components and/or systems depicted therein (and/or components and/or systems not illustrated). The functionalities of the vehicle control system 200 and/or the vehicle 100 will be described below.

The energy transfer devices, such as the first inductive coil 216, the second inductive coil 218, the first conductive material 222, and the second conductive material 224, are any type of devices that transfer energy wirelessly (e.g., without a wired connection). For example, the energy transfer devices may transfer energy from the vehicle 100 (e.g., from the energy source 202) to one or more components and/or systems in the vehicle 100, such as the heated handgrips 110, and/or one or more components and/or systems exterior to the vehicle 100, such as articles worn by the user. Additionally, and/or alternatively, the energy transfer devices may be used to charge the energy source 202. In other words, a plug and/or outlet may be used to provide power (e.g., current and/or voltage) to an energy transfer device. The energy transfer device provides the current to another energy transfer device in the vehicle 100, which then provides the current to the energy source 202.

For example, the first inductive coil 216 uses inductance (e.g., inductive power transfer) to transfer energy (e.g., current) to the second inductive coil 218. For example, providing a current to the first inductive coil 216 causes the first inductive coil 216 to create a magnetic field. By bringing the second inductive coil 218 in close enough proximity to the first inductive coil 216 (e.g., the created magnetic field), the magnetic field induces the second inductive coil 218 to provide a current to the load 220. In other words, by providing a current from the controller 207 to the first inductive coil 216, the first inductive coil 216 induces a current on the second inductive coil 218. The second inductive coil 218 provides the current to the load 220. In some instances, using induction, the first inductive coil 216 does not need to physically touch the second inductive coil 218 transfer energy to the second inductive coil 218 (e.g., the coils 216, 218 are separated by a certain distance). In some examples, the first inductive coil 216 and/or the second inductive coil 218 may include one or more coils. In other words, the first and second inductive coils 216 and 218 may include multiple inductive coils (e.g., three coils) used to supply power to the load 220 and/or recharge the energy source 202. The controller 207 may provide the current and/or voltage to the one or more first inductive coils 216 and the second inductive coils 218.

Further, the first conductive material 222 uses conductance (e.g., conductive power transfer) to transfer energy to the second conductive material 224. The first conductive material 222 is a power transmitter that delivers power to the second conductive material 224 (e.g., a receiver). For example, after the first conductive material 222 makes a physical connection to the second conductive material 224, the first conductive material 222 transfers a current from the energy source 202 to the second conductive material 224. The second conductive material 224 provides the current to the load 220. The first and second conductive material 222, 224 is any type of conductive material including, but not limited to copper wires, aluminum, steel, gold, ferrous cores, and/or other types of wires.

In some examples, the first energy transfer device (e.g., the first inductive coil 216 and/or the first conductive material 222) is operatively coupled to the frame 104 of the vehicle 100. For example, the first energy transfer device may be located anywhere on the vehicle 100 including, but not limited to, the vehicle steering member 108, the vehicle user grips 110, the seat 106, the floorboards 112, a backrest of vehicle 100, and/or a vehicle side-stand.

In some variations, the second energy transfer device (e.g., the second inductive coil 218 and/or the second conductive material 224) is operatively coupled to the frame 104 and/or the load 220. For example, the second energy transfer device may be located anywhere on the vehicle 100 (e.g., the vehicle handgrips 110) and/or the load 220. Additionally, and/or alternatively, the second energy transfer device may be located at and/or operatively coupled to a contact point between the user and the vehicle 100, such as, but not limited to, the vehicle steering member 108, the vehicle user grips 110, the seat 106, the floorboards 112, a backrest of vehicle 100, and/or a vehicle side-stand.

The load 220 receives current from the second inductive coil 218 and/or the second conductive material 224. The load 220 includes heating circuitry and/or elements that increase the temperature of the load using the current from the second energy transfer device. In some instances, the load 220 includes one or more components, devices, wires, and/or sub-systems that converts the electricity (e.g., the current) to heat. For example, the load 220 is an article worn by a user (shown on FIGS. 4 and 5) and/or one or more vehicle handgrips, such as handgrips 110 (shown on FIGS. 2 and 3). The load 220 converts the current to heat up the article and/or handgrips 110. In some examples, the load 220 includes non-heating circuitry and/or components. For instance, the load 220 is a USB, a light (e.g., a light operatively coupled to an article), and/or a vented helmet. The processor 212 may provide the current and/or the voltage to the first and second energy transfer devices to power up the non-heating circuitry and/or components.

Figure 6:
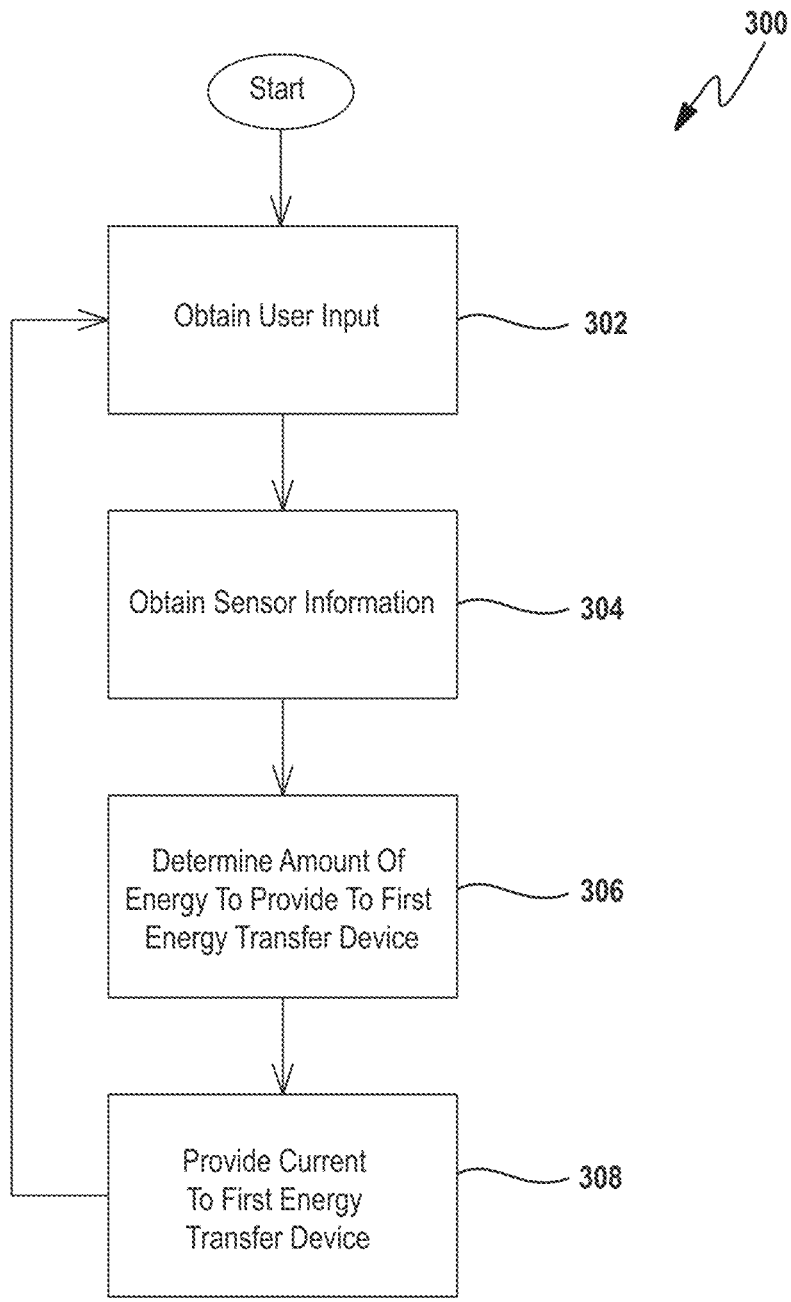
FIG. 6 shows a flowchart describing the operation of a controller to control a temperature of a load.

FIG. 6 shows an example flowchart describing a method 300 for the controller 207 (e.g., the processor 212) to control a temperature of the load 220. In operation, at step 302, the processor 212 receives user input from the user input device 204. In some examples, the user input device 204 is an analog temperature selector, such as one or more physical switches and/or buttons. For example, a user may use the user input device 204 to set a heat setting for the load 220. In response to a user pressing and/or actuating a button, lever, and/or switch, the user input device 204 provides the user input indicating the actuation to the processor 212. The processor 212 receives the user input from the input device 204 and then changes the current output based on the user input. For example, the user input device 204 may control a temperature of the load 220. In some instances, there may be multiple different temperature settings (e.g., 0, 1, 2, . . . etc.). For example, 0 may indicate to apply no heat to the load 220, 1 may indicate a low heat setting, 2 may indicate a middle heat setting, and 3 may indicate a high heat setting. By actuating and/or pressing the user input device 204 (e.g., pressing a button), the processor 212 changes from a first temperature setting (e.g., a low heat setting) to a second temperature setting (e.g., a high heat setting).

In some variations, the user input device 204 is a digital temperature selector, such as a touch screen, user interface, and/or display device. For example, the user input device 204 may cause display of an image and/or prompt indicating the current heat setting (e.g., current heated grip level). The user may use the user input device 204 to set a new heat setting (e.g., new heated grip level). The user input device 204 obtains the new heat setting, and provides the new heat setting to the processor 212. In some examples, there may be multiple different heat settings that the user can select.

At step 304, the processor 212 receives sensor information from one or more sensors, components and/or systems. For example, the processor 212 receives sensor information from multiple different sensors 206, components, and/or systems, including an ambient temperature sensor, a vehicle speed sensor, a battery voltage sensor (e.g., an energy source sensor), and/or one or more body temperature sensors. For example, the vehicle speed sensor provides information indicating a vehicle speed to the processor 212. The vehicle speed sensor is any type of sensor that detects a vehicle speed of the vehicle 100.

The battery voltage sensor provides information indicating a battery voltage (e.g., a state of charge of the energy source 202) to the processor 212. The battery voltage sensor may be operatively coupled to the energy source 202 and may be any type of sensor that detects the state of charge of the energy source 202. For example, the battery voltage sensor is a battery monitoring sensor that monitors and detects/determines a charge of the energy source 202.

The ambient temperature sensor provides information to the processor 212 indicating a detected ambient temperature reading. In some examples, the ambient temperature reading is a temperature reading of the environment surrounding the vehicle 100.

The body temperature sensor provides information to the processor 212 indicating one or more body temperatures of a user. For example, one or more body temperature sensors may be attached to the article worn by the user and/or the body of the user. The body temperature sensor may detect and/or determine a temperature reading of the attached location (e.g., a body temperature of the user). The body temperature sensor may provide, via a communication method (e.g., wired and/or a radio frequency, such as a WiFi protocol and/or BLUETOOTH), the temperature reading to the processor 212. In some instances, the controller 207 includes a radio frequency receiver. The controller 207 uses the radio frequency receiver to receive the temperature readings and provides the temperature readings to the processor 212. In some instances, the article worn by the user includes multiple body temperature sensors at various locations within the article. For example, the article is clothing, such as a jacket, shirt, pants, and/or gloves. Each article of clothing includes a body temperature sensor that provides a body temperature reading to the processor 212 via the radio frequency receiver.

At step 306, the processor 212 determines an amount of current to provide to the first energy transfer device (e.g., the first inductive coil 216 and/or the first conductive material 222). For example, based on the user input and/or the sensor information, the processor 212 determines an amount of current to provide to the first energy device. In some examples, the processor 212 determines a voltage and/or an amount of power to provide to the first energy device.

At step 308, the processor 212 provides the determined amount of current, voltage, and/or power to the first energy transfer device. In other words, the processor 212 provides a signal and/or command to the current limiting device 210 to limit the current, voltage, and/or power from the energy source 202 via the high frequency inverter 208 based on the determined current amount. For example, if the processor 212 determines the current to provide to the first energy transfer device is 2 Amps, the processor 212 provides the signal or command to the current limiting device 210. The current limiting device 210 limits the AC current such that the magnitude of the current is 2 Amps.

In some variations, after providing the determined current, voltage, and/or power to the first energy transfer device and based on the first energy transfer device being in proximity to the second energy transfer device, the first energy transfer device may transfer the current, voltage, and/or power to the second energy transfer device. For example, as a user wearing an article that includes the second energy transfer device (e.g., the second inductive coil 218 and/or the second conductive material 224) moves within a certain proximity to the first energy transfer device (e.g., a component of the vehicle 100, such as the first coil 216 and/or the first material 222), the first energy transfer device may transfer energy to the second energy transfer device. In other words, if the first and second conductive materials 222 and 224 are in physical contact, then the first conductive material 222 may transfer energy to the second conductive material 224. Additionally, and/or alternatively, if the second coil 218 is within a certain proximity and/or distance from the first coil 216, the first coil 216 may transfer energy to the second coil 218.

In some instances, based on the user input indicating a heat setting, the processor 212 determines and/or provides an amount of current, voltage, and/or power to the first energy transfer device (e.g., the first inductive coil 216 and/or the first conductive material 222). For example, for a low heat setting, the processor 212 provides 1 to 1.5 Amps. For a high heat setting, the processor 212 provides 2 to 2.6 Amps.

Additionally, and/or alternately, based on the vehicle speed, the processor 212 determines and/or provides an amount of current, voltage, and/or power to the first energy transfer device (e.g., the first inductive coil 216 and/or the first conductive material 222). For example, based on the vehicle speed satisfying one or more thresholds (e.g., over 10 mph, over 20 mph), the processor 212 determines a different amount of current to provide to the first energy transfer device. Additionally, and/or alternatively, the processor 212 uses a function and/or algorithm and the vehicle speed to determine an amount of current to provide the first energy transfer device. In some instances, as the vehicle speed increases, the processor 212 increases the amount of current, which causes the temperature of the load 220 to increase.

Additionally, and/or alternatively, based on the ambient temperature, the processor 212 determines and/or provides an amount of current, voltage, and/or power to the first energy transfer device (e.g., the first inductive coil 216 and/or the first conductive material 222). For example, based on the ambient temperature satisfying one or more thresholds (e.g., below 50 degrees, below 30 degrees), the processor 212 determines a different amount of current to provide to the first energy transfer device. Additionally, and/or alternatively, the processor 212 uses a function and/or algorithm and the ambient temperature to determine an amount of current to provide the first energy transfer device. In some instances, as the ambient temperature decreases, the processor 212 increases the amount of current causing the temperature of the load 220 to increase.

Additionally, and/or alternately, based on the battery voltage, the processor 212 determines and/or provides an amount of current, voltage, and/or power to the first energy transfer device (e.g., the first inductive coil 216 and/or the first conductive material 222). For example, based on the battery voltage satisfying one or more thresholds, the processor 212 determines a different amount of current to provide to the first energy transfer device. For instance, if the battery voltage drops below a threshold, the processor 212 determines and/or reduces the current provided to the first energy transfer device.

Additionally, and/or alternatively, based on the one or more body temperature readings, the processor 212 determines and/or provides an amount of current, voltage, and/or power to the first energy transfer device (e.g., the first inductive coil 216 and/or the first conductive material 222). For example, the user input may indicate a heat setting, such as a low, medium, or high heat setting. Each heat setting may include a corresponding body temperature. The processor 212 may compare the body temperature readings with the user input heat setting. If the body temperature reading is above the user input heat setting, the processor 212 may reduce the current to the first energy transfer device. If the body temperature reading is below the user input heat setting, the processor 212 may increase the current to the first energy transfer device. If it is equal, the processor 212 may maintain the current to the first energy transfer device.

In some examples, the article worn by the user includes a maximum temperature limit switch. For example, a maximum temperature limit switch may be included between the load 220 and the second inductive coil 218 and/or the second conductive material 224. The maximum temperature limit switch may detect and/or monitor a temperature of the load 220 (e.g., the article worn by the user). If the temperature is greater than a maximum temperature limit, the maximum temperature limit switch may open the circuit to the load 220 (e.g., turn off the heating capabilities of the load 220).

Figure 7:
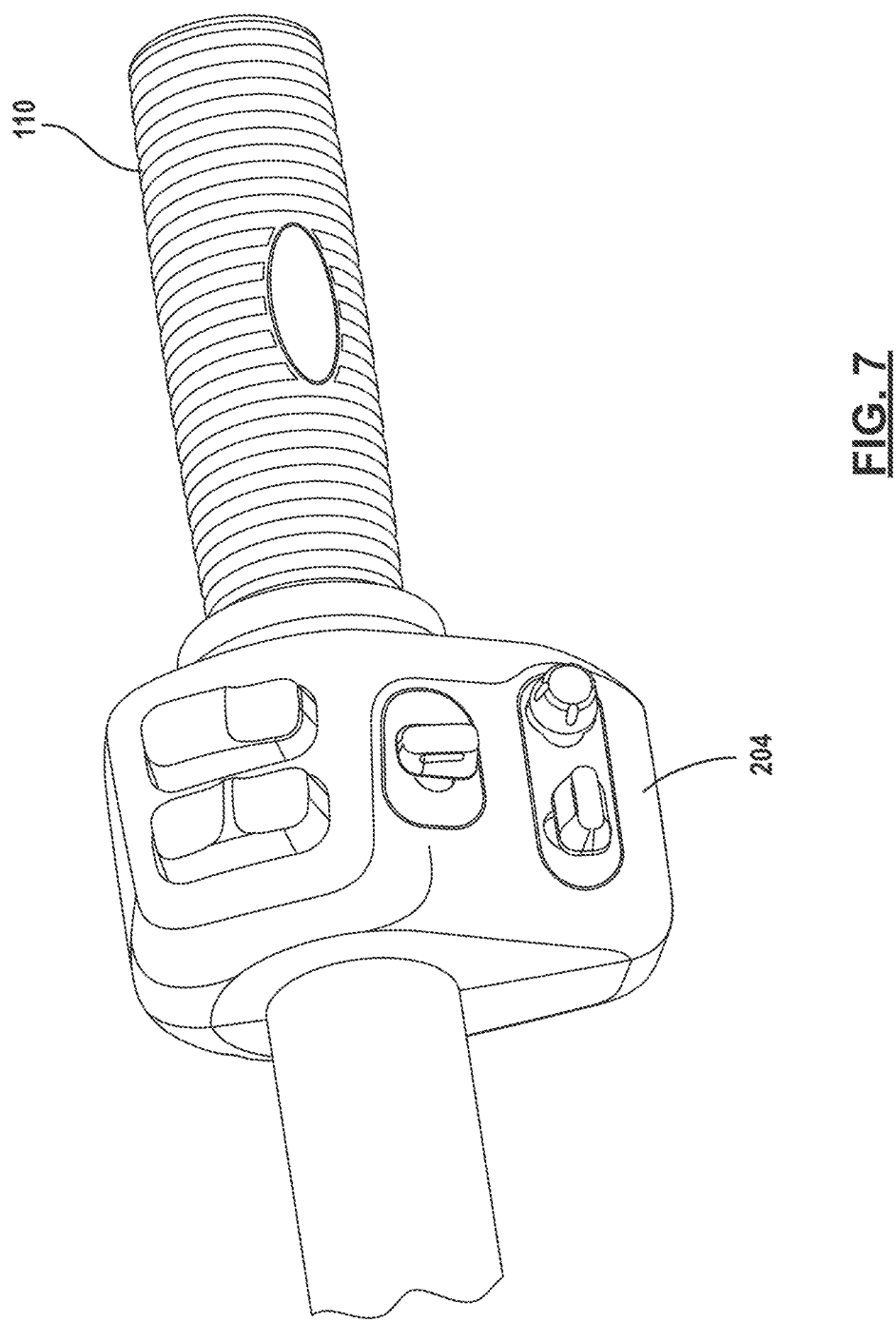
FIG. 7 is a rear perspective view of a steering input that is controlled by the controller of FIG. 6.
Figure 8:
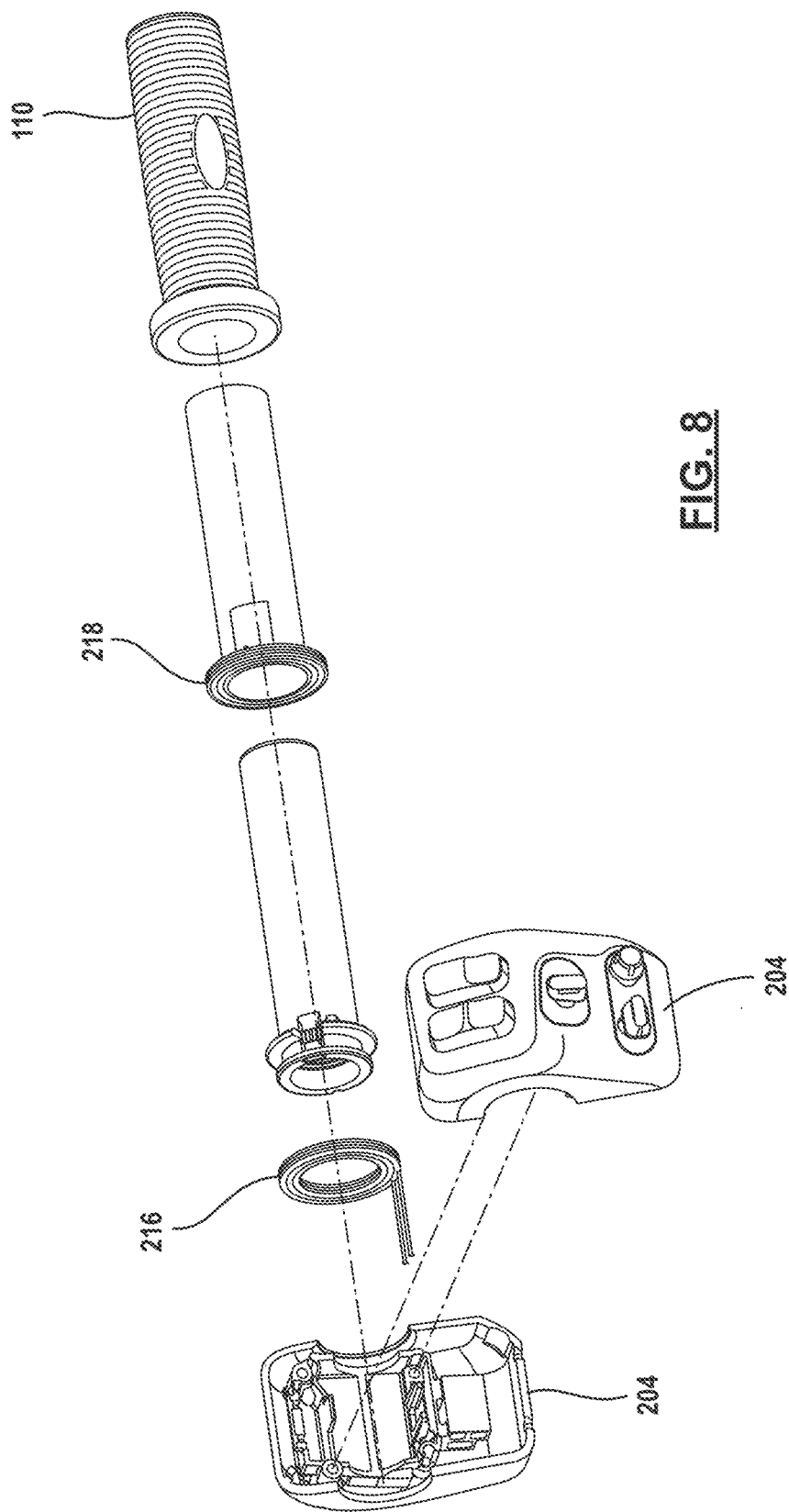
FIG. 8 is an exploded view of the steering input of FIG. 7.

FIGS. 7-10 show an illustrative implementation of method 400 and the vehicle control temperature system 200. In other words, FIGS. 7-10 show the operation of the processor 212 providing a current, voltage, and/or power to the first and second energy transfer devices to power the load 220 (e.g., a vehicle handgrip 110). For example, FIG. 7 shows the handgrip 110 and the user input device 204 (e.g., an analog temperature selector). As mentioned previously, a user may use the analog temperature selector 204 to change a temperature setting for the load 220, such as the handgrip 110 and/or the heating elements within the handgrip. FIG. 8 shows an exploded view of the handgrip 110 and the user input device 204 of FIG. 7. For example, FIG. 8 shows the first energy transfer device (e.g., the first inductive coil 216) and the second energy transfer device (e.g., the second inductive coil 218).

Figure 9:
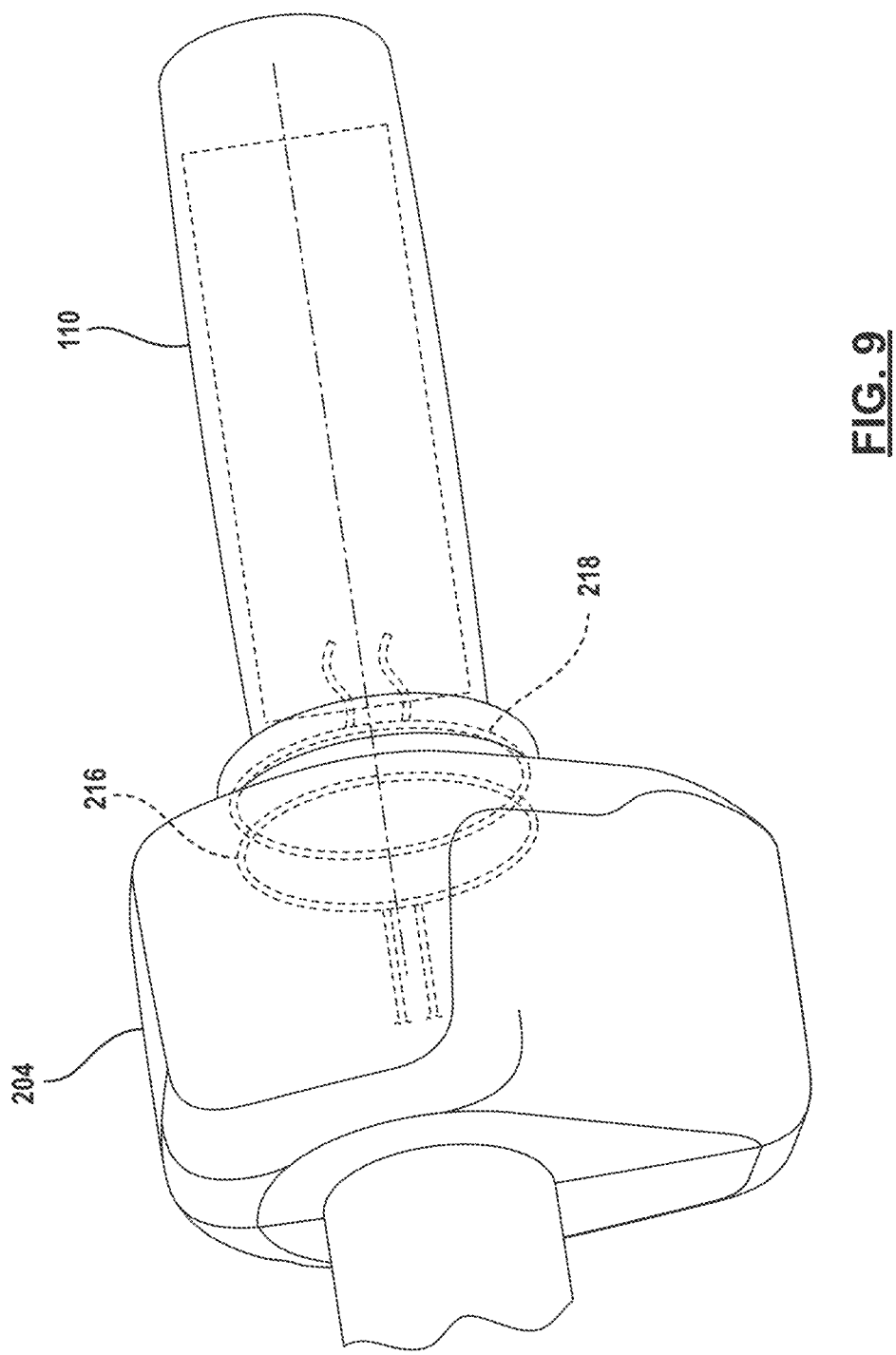
FIG. 9 is a front perspective view of the steering input of FIG. 7.
Figure 10:
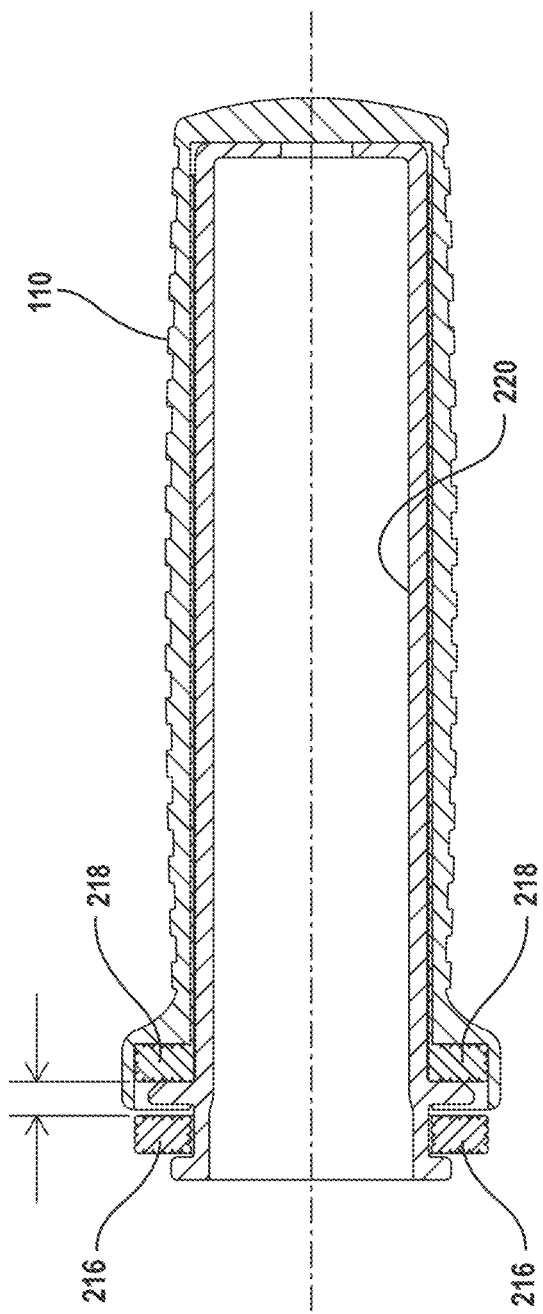
FIG. 10 is a cross-sectional view of the steering input of FIG. 7.

FIG. 9 shows the interior of the user input device 204 and the handgrip 110 when assembled. For example, as shown, the first and second inductive coils 216 and 218 are positioned such that there is a separation (e.g., a few millimeters separation) between them. In some examples, the coils 216 and 218 are circular in shape, and both are wound relative to a first axis. FIG. 10 shows a cross-section view of the handgrip 110. As shown, the two coils 216 and 218 are separated by a certain distance. Further, the second inductive coil 218 is operatively coupled to (e.g., connected) to the load 220. For example, the load 220 includes one or more wires, heated circuitry, material, heating elements, and/or other components located in the interior of the handgrip 110.

The first inductive coil 216 and second inductive coil 218 are operatively coupled to the frame 104 and located at the handgrips 110. In operation, the first inductive coil 216 receives current from the controller 217. The first inductive coil 216 provides, using an inductive power and/or current transfer, the received current to the second inductive coil 218. The second inductive coil 218 provides a current to the load 220 such that the load provides heat to the handgrips 110.

Figure 11:
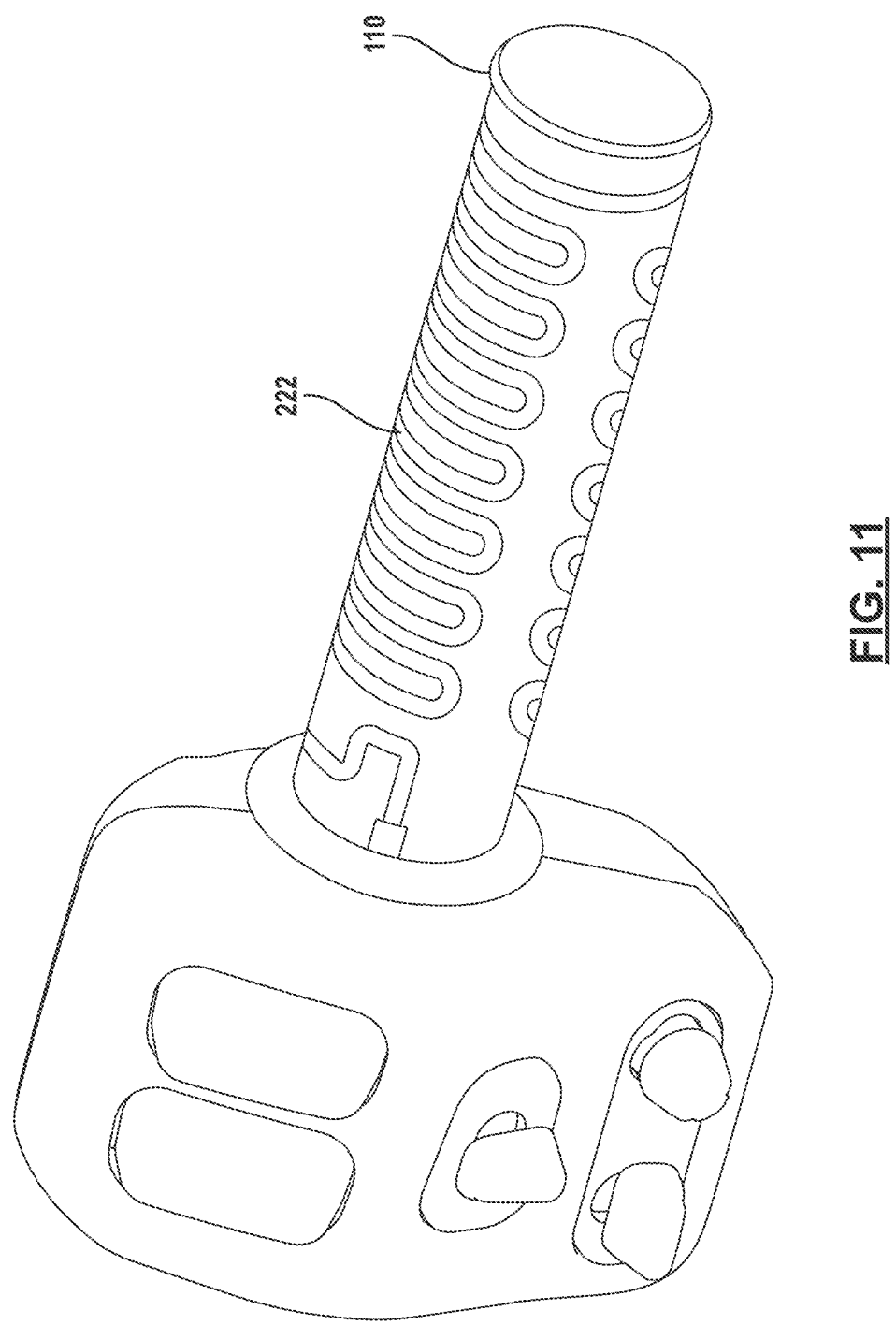
FIG. 11 is another perspective view of the steering input.
Figure 12A:
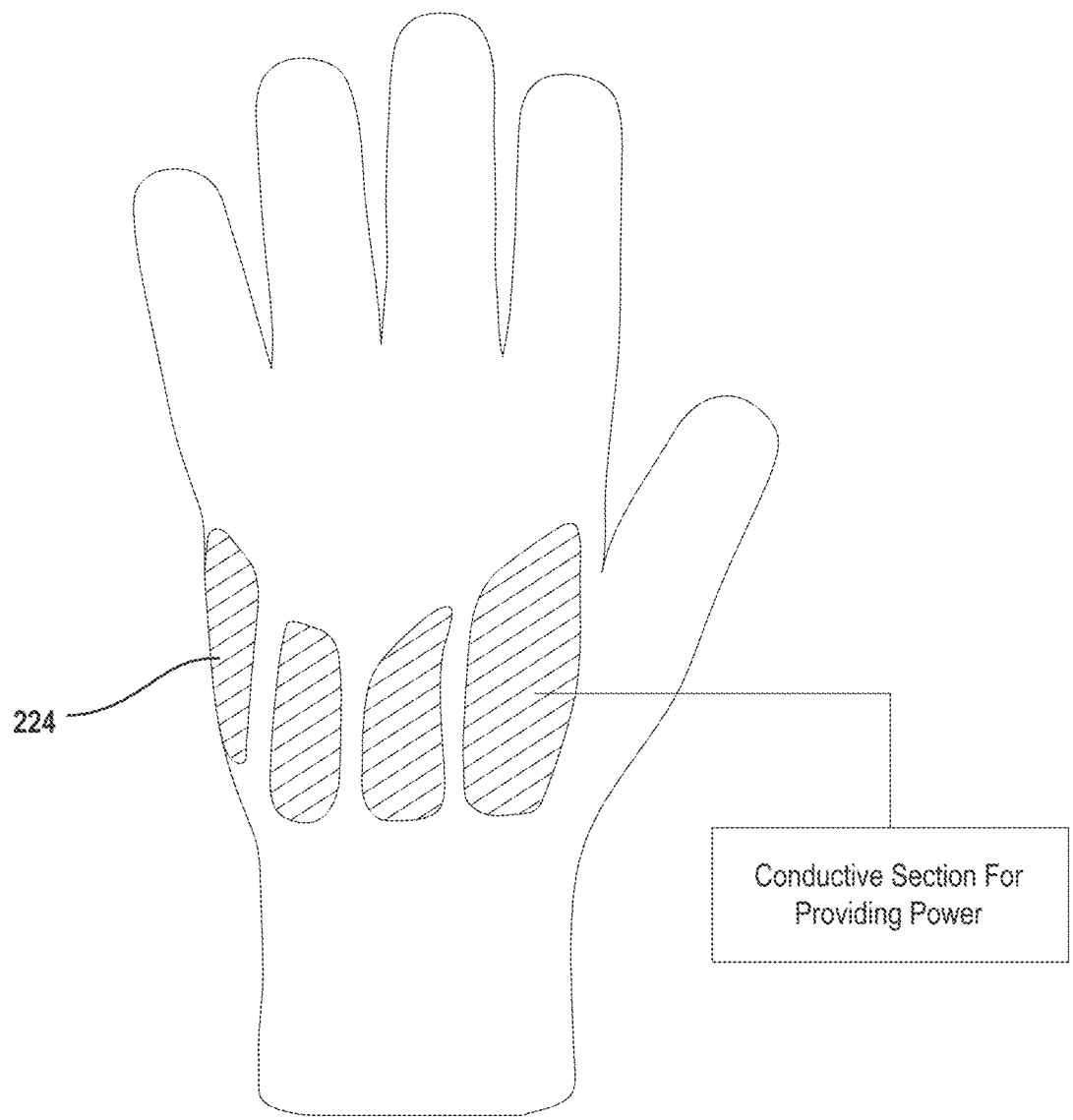
FIG. 12A shows an example of an article worn by the user and for use with the steering input of FIG. 11.
Figure 12B:
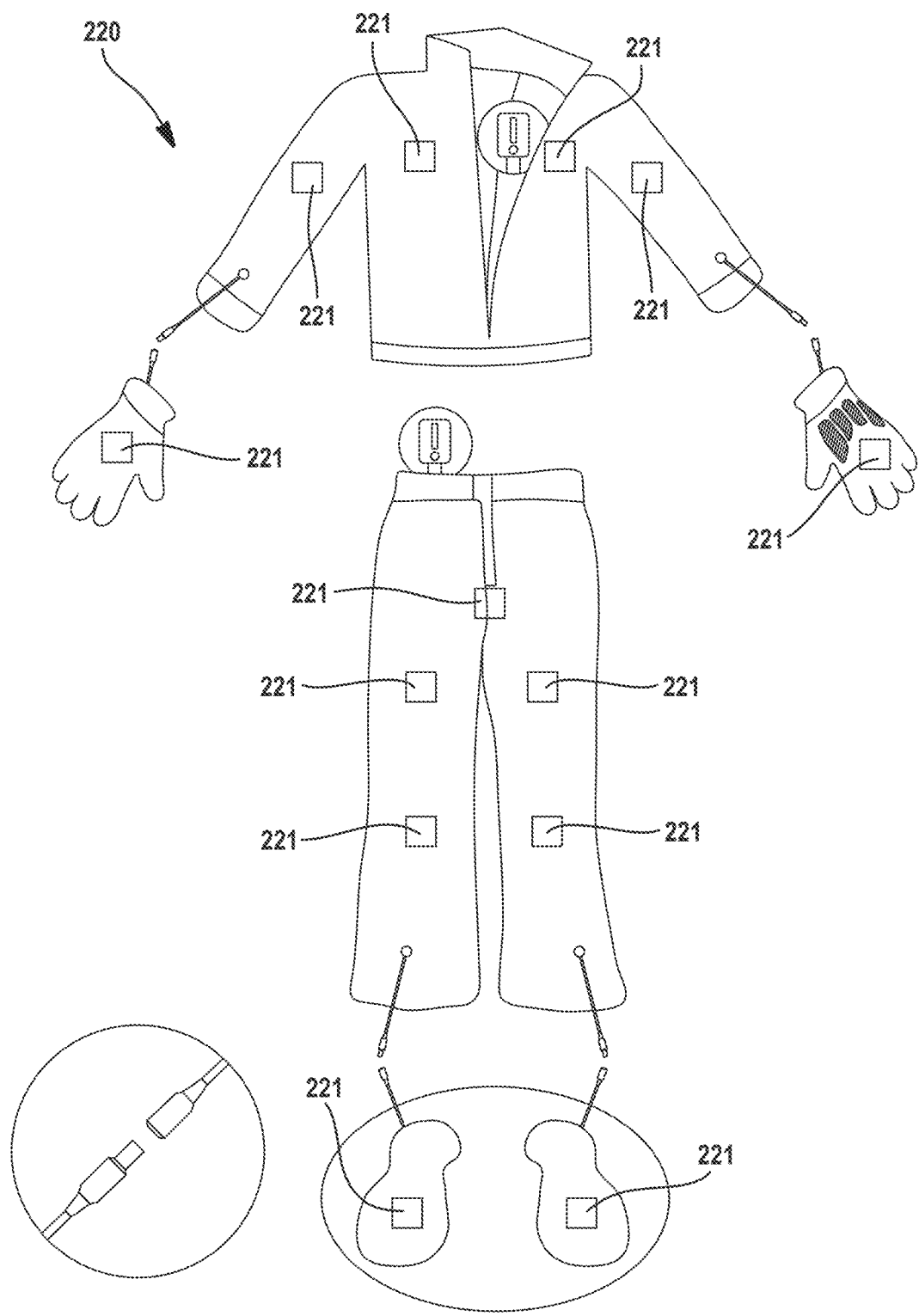
FIG. 12B shows another example of the articles worn by the user and or use with the vehicle of FIG. 1.

FIGS. 11, 12A and 12B show another illustrative implementation of method 400 and the vehicle control temperature system 200. For example, FIG. 11 shows the first energy transfer device (e.g., the first conductive material 222) and the handgrip 110. The first conductive material 222 is located at the handgrip 110 (e.g., on a surface or exterior of the handgrip 110) and operatively coupled to the frame 104. FIG. 12A shows the second energy transfer device (e.g., the second conductive material 224). The second conductive material 224 is located and/or attached to an article worn by the user (e.g., on the outside of the glove). In operation, the user wearing the article (e.g., the second conductive material 224) may touch, connect, interacts, and/or physically makes contact with the handgrip 110 (e.g., the first conductive material 222) such that a conductive power transfer occurs. In other words, the current provided by the controller 217 is transferred to the second conductive material 224 (e.g., glove).

FIG. 12B shows the load 220. For example, the load 220 includes the glove (e.g., the second conductive material 224), pants, shoes, and a jacket. The load 220 may also include one or more wires that provides power from the second conductive material 224 throughout the load 220 (e.g., to the jackets, pants, shoes, and/or gloves). In some examples, the shoes, pants, and/or jacket may include the second conductive material 224. In such examples, the floorboards 112 and/or other portions of the vehicle 100 may include the first conductive material 222 that provides power to the second conductive material 224.

In some instances, the article worn by the user is powered using the first and second inductive coils 216 and 218. For example, similar to above, the first inductive coil 216 may be located in the handgrips 110 and/or other portions of the vehicle 100. The second inductive coil 218 may be in an article worn by the user, such as the pants, gloves, jackets, and/or shoes.

The article may include occupant condition sensors 221 in one or more locations of the article to be worn. Individual control of heating and cooling of various regions around the occupant or within the occupants articles to be worn may be performed. As is described in detail below.

Figure 12C:
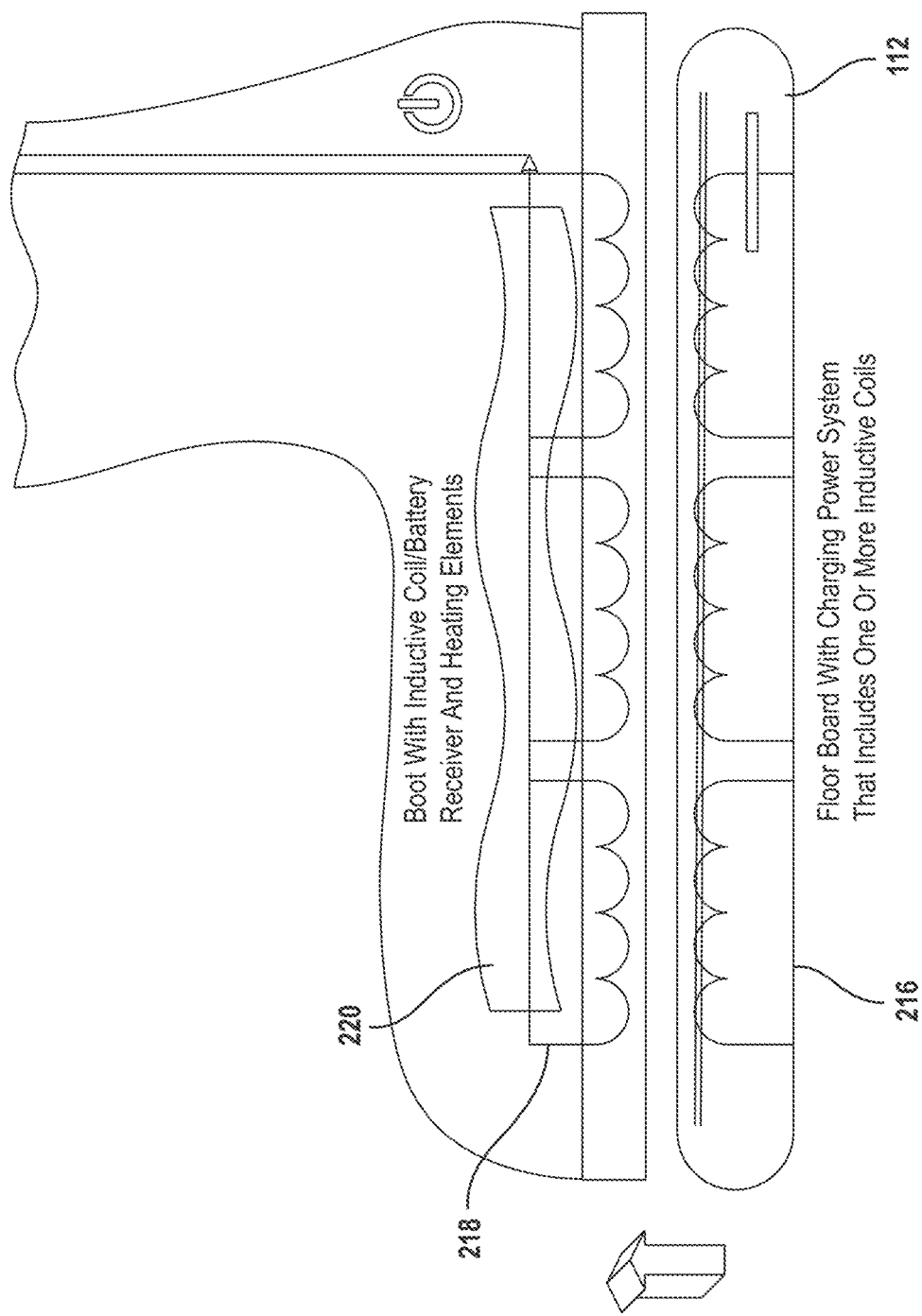
FIG. 12C shows an example of one or more induction coils and an article worn by a user.

FIG. 12C shows an example of powering the article worn by the user using the first and second inductive coil(s) 216 and 218. For example, the one or more first inductive coil(s) 216 may be located in the floorboards 112. The one or more second inductive coil(s) 218 may be located in an article worn by the user, such as in a boot, shoe, and/or other footwear worn by the user. In operation, the first coils 216 transfer power to the second coils 218 to heat up the load 220 (e.g., the heating elements within the footwear). Additionally, and/or alternatively, the load 220 may include additional heating elements in other articles worn by the user, such as in one or more gloves, pants, and/or jacket worn by the user.

In some examples, the first inductive coil 216 and the second inductive coil 218 are located in the handgrips 110. For example, as explained above, the first inductive coil 216 provides a current, voltage, and/or power to the second inductive coil 218 to heat the handgrips. Additionally, and/or alternatively, the second inductive coil 218 provides the current, voltage, and/or power to a first conductive material 222 located at the handgrips 110 (e.g., shown in FIG. 11). When the article (e.g., the second conductive material 224) physically makes contact with the first conductive material 222, the current from the first conductive material 222 (provided by the second inductive coil 218 via the first inductive coil 216) is transferred to the second conductive material 224. The second conductive material 224 provides the current to the load 220 (e.g., shown in FIG. 12B). In other words, the examples shown in FIGS. 7-12B are combined such that a current provided from the energy source 202 is transferred from the heated handgrips to the load 220 (e.g., the jacket, pants, shoes, and/or gloves shown in FIG. 12B).

Vehicle Control System Configured for Charging

Figure 13B:
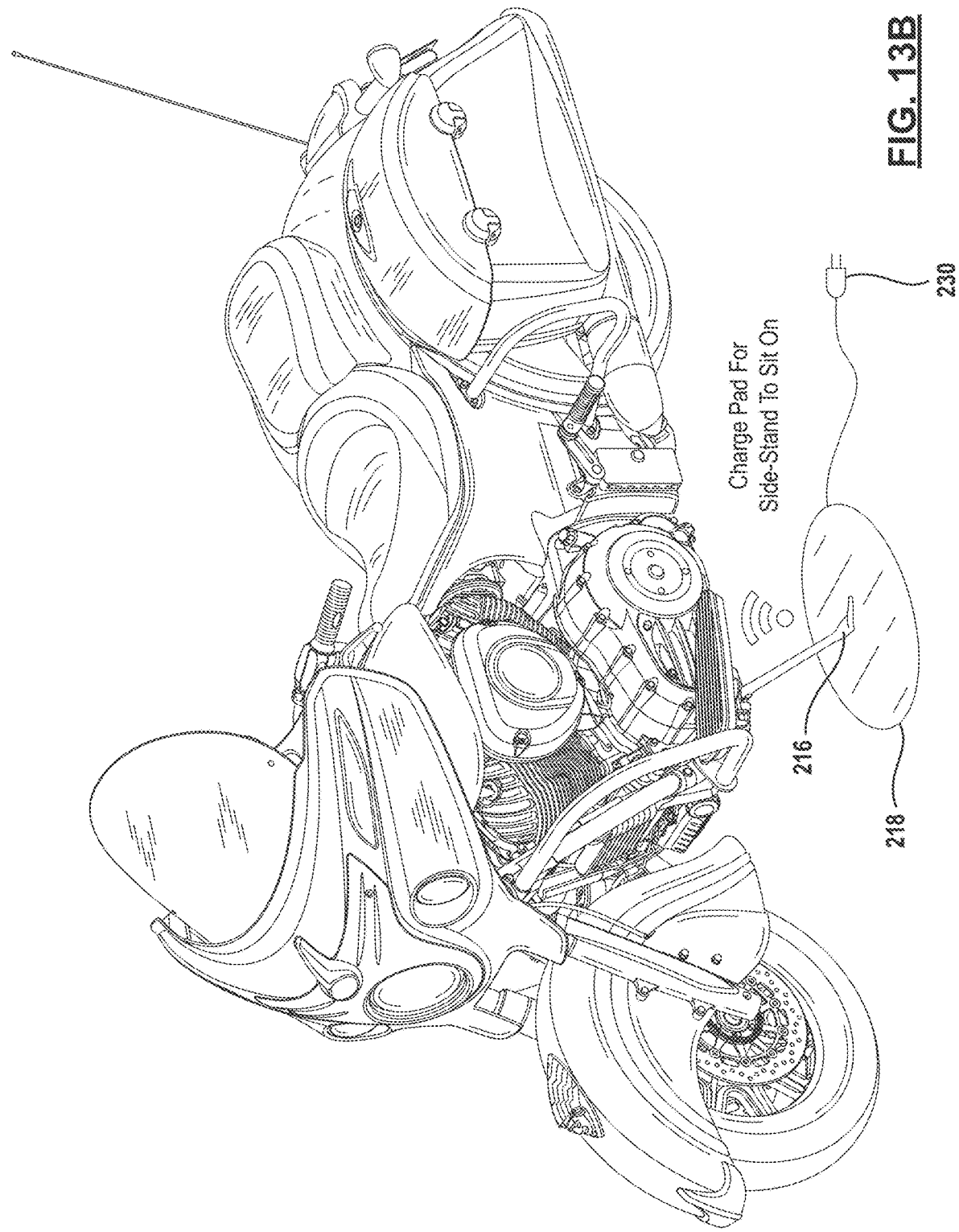
FIG. 13B shows another example of recharging an energy source of the vehicle control system.
Figure 15:
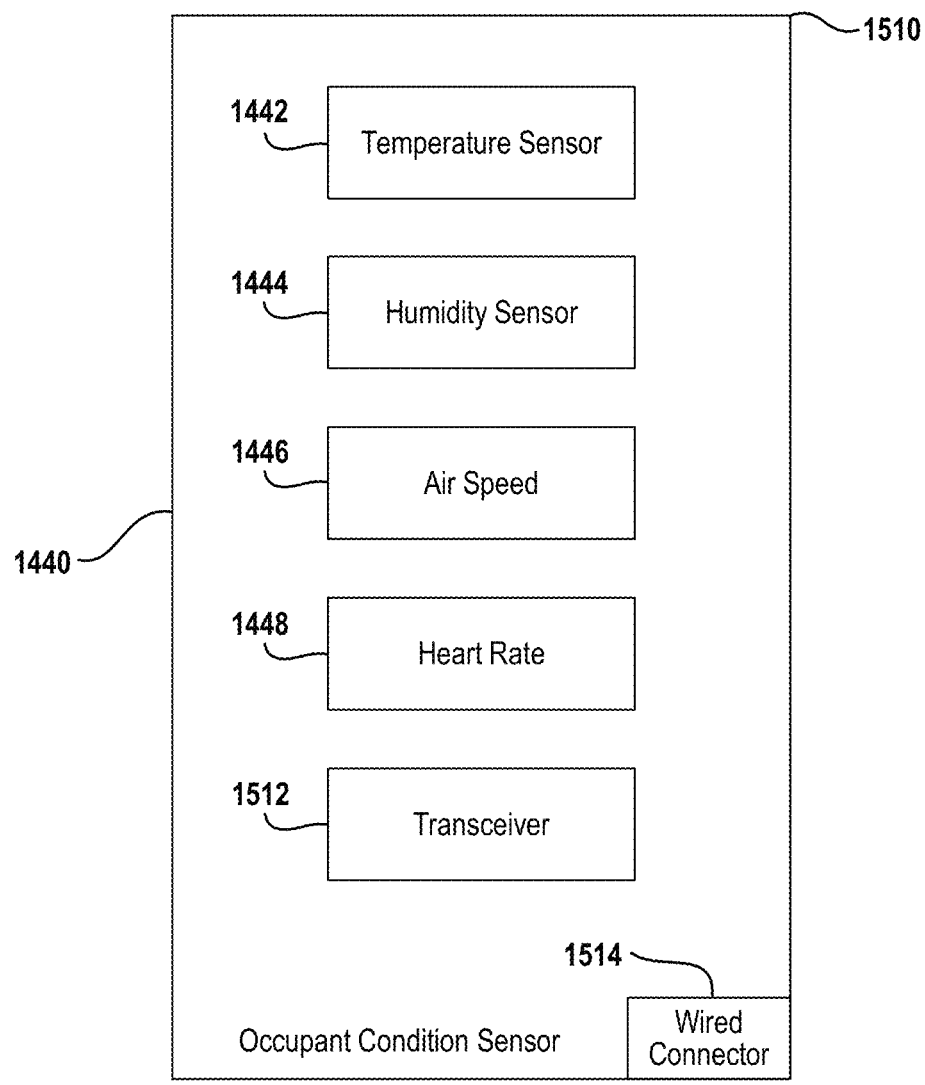
FIG. 15 is a block diagram of an occupant sensor.

FIGS. 13A and 13B show another illustrative implementation the vehicle control system 200. However, instead of providing power from the energy source 202 to the load 220, FIGS. 15 and 16 show a method of charging the energy source 202 of the vehicle 100. In some instances, the battery state degrades between rides. As such, using a wireless charging map may help make charging easier and allow little to no wiring between the charging device and the vehicle to charge the battery between rides.

Referring to FIGS. 13A and 13B, an AC outlet 230 (e.g., a household outlet or electrical outlet) may be coupled to a charging device. The charging device may include an outlet component (e.g., plug, socket) that is operatively coupled to the AC outlet. The charging device may also include one or more wires that electrically connect the outlet component to the second inductive coil 218. The second inductive coil 218 is located outside of the vehicle 100. For example, the second inductive coil 218 is located within a charging mat (e.g., wireless charging mat), docking stations, charging platform, pad, and/or other materials, devices, or objects that are able to include an inductive coil.

The first inductive coil 216 is located, operatively coupled to, and/or attached to the vehicle 100. For example, the first inductive coil 216 is within a side-stand of the vehicle 100. Additionally, and/or alternatively, the first inductive coil 216 is located on one portion of the vehicle 100 (e.g., at a closest portion of the vehicle 100 to the charging device).

In operation, the AC outlet 230 may power and/or provide a current to the second inductive coil 218 via the outlet component. The second inductive coil 218 inductively transfers power (e.g., provides a current) to the first inductive coil 216. Then, referring to FIG. 4, the first inductive coil 216 provides the current to the energy source 202 via the controller 207. In some examples, the current may bypass the controller 207 and be provided to the energy source 202.

In some instances, the energy source 202 may be charged using the first and second conductive materials 222, 224. For example, instead of the inductive coils 216 and 218, the AC outlet 230 may power and provide a current to the second conductive material 224. The second conductive material 224 may provide the current to the first conductive material 222 and then to the energy source 202. The second conductive material 224 may be located within a charging mat (e.g., wireless charging mat), docking stations, charging platform, pad, and/or other materials or objects that are able to include a conductive material. The first conductive material 222 may be located at the side-stand and/or another portion of the vehicle 100 (e.g., at a closest portion of the vehicle 100 to the charging device).

Figure 14:
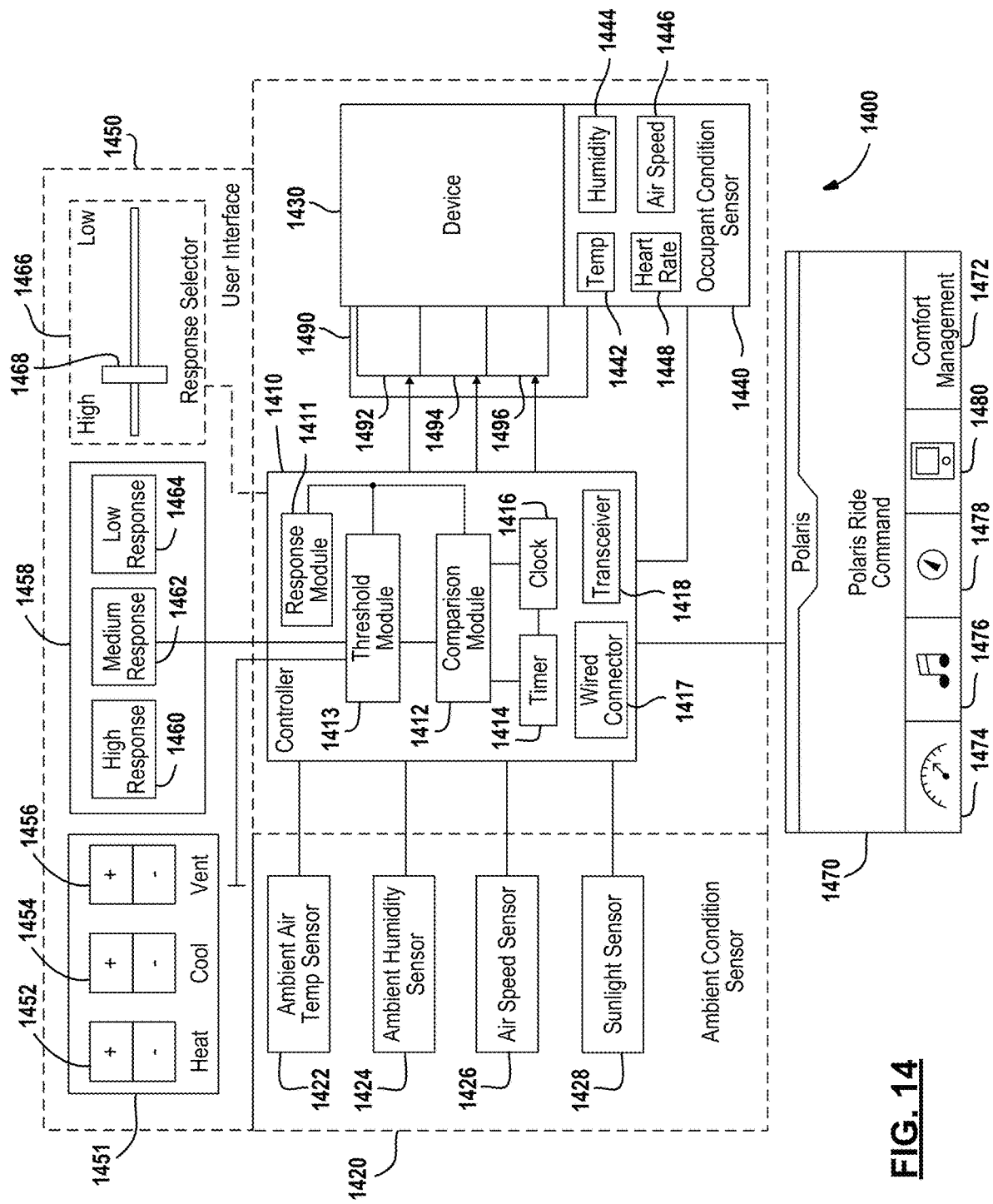
FIG. 14 is a comfort management system for controlling a device.

Referring now to FIG. 14, a comfort management system 1400 may be used for controlling a seat or another device in response to a user input and other inputs such as the ambient conditions in and around the vehicle occupant or occupants or the conditions of the occupants themselves. A controller 1410 may be a microprocessor-based controller that is programmed to perform various functions. In this example, the controller 1410 is in communication with an ambient condition sensor 1420 and a device 1430. An occupant condition sensor 1440 is used to generate an occupant condition signal that has occupant condition data. A user interface 1450 provides a way for a user to provide data for desired settings to be communicated to the controller 1410. The user interface 1450 may also use the various user interfaces set forth in FIGS. 12 and 13A-13C.

The user interface may also be implemented with a touch screen display 1470 that is in communication through the controller area network. The touch screen display 1470, in addition to providing a user interface, may also provide various descriptions and the like for the user. Of course, the display 1470 may be used for other functions such as the radio, navigation, and vehicle conditions.

The ambient condition sensor 1420 may be one or more sensors that are used by the controller 1410 to control various conditions. In this example, an ambient air temperature sensor 1422 generates an ambient air temperature sensor signal that has data corresponding to the ambient air temperature at or within the vehicle. The ambient air temperature sensor 1422 may be located near one or more of the occupants. The ambient humidity sensor 1424 generates an ambient humidity signal that has data corresponding to the ambient humidity. The ambient humidity may be determined around the occupant or around the vehicle. An air speed sensor 1426 generates an air speed signal that has data corresponding to the speed of the air in or around the occupant or vehicle. A sunlight sensor 1428 generates a sunlight signal having data corresponding to an amount of direct sunshine directed to the sensor.

Although one ambient air temperature sensor 1422, one ambient humidity sensor 1424, one air speed sensor 1426 and one sunlight sensor 1428 are illustrated, more than one of the sensors may be provided in a system. For example, more than one vehicle location for an occupant is provided in many vehicles. An ambient condition sensor 1420 may thus be provided at or near one or more of the occupants. The ambient condition 1420 may also be located in various locations of the vehicle. For example, an ambient condition sensor may be located around the lower extremities of an occupant (e.g., the foot well) and another ambient condition sensor may be located toward the head or torso of a vehicle occupant.

The device 1430 may be a seat or another type of device, such as a hand grip, a foot rest, or clothing that the occupant wears as described above.

The occupant condition sensor 1440 generates a signal corresponding to the conditions or adjacent to the occupant. The occupant condition sensor 1440 may be one or more sensors selected from a temperature sensor 1442, a humidity sensor 1444, an air speed sensor 1446, and a heart rate sensor 1448. The temperature sensor 1442 generates a temperature signal having data corresponding to the temperature of the location of the occupant condition sensor. The data from the temperature sensor signal may be used by the controller 1410. The humidity sensor 1444 generates a humidity signal having data corresponding to the humidity at the location of the occupant condition sensor, namely, the position relative to the occupant.

The air speed sensor 1446 generates an air speed signal having data corresponding to the air speed at the occupant. The air speed allows the controller 1410 to compensate for the chilling effects of wind.

The heart rate sensor 1448 generates a signal having data corresponding to the heart rate of the occupant. Increased heart rate may cause the controller to provide lower heating, increase cooling or increase venting.

The occupant condition sensor 1440 may be located in various positions. In a seat, the occupant condition sensor 1440 may be located on or near the seating location. The occupant condition sensor 1440 may also be located in clothing that the occupant is wearing. One or more occupant condition sensors may be provided in an article of clothing. For example, the occupant condition sensor 1440 may be located in an helmet, within a shirt or outerwear, within pants, within sockets or within gloves. Of course, other positions for the occupant condition sensor 1440 may be provided.

The user interface 1450 may provide one or more ways in which to provide user input to the system. A set 1451 of switches 1452, 1454 and 1456 may be used to control various functions. A switch 1452 is used to control the heating. A switch 1454 is used to control the cooling and the switch 1456 is used to control the vent. In this example, the system may control the providing of heat with the switch 1452 and increasing or decreasing the heat. The switch 1454 is used to increase or decrease the amount of cooling. The switch 1456 is used to increase or decrease the vent air. The vent may provide ambient or unconditioned air to the occupant without heating or without cooling.

A response of the heating or cooling module 1490 may be provided with a switch 1458. The response of the system refers to how fast the system reacts or changes based on inputs from the ambient condition sensors. That is, the response refers to the amount or how quickly the system provides heating, cooling or venting in response to the sensed condition from the ambient condition sensor 1420 or the occupant condition sensor 1440. A high response is obtained by selecting the high response button 1460 which provides a quick response from the heating and cooling module 1490. Selecting the medium response button 1462 provides a slower response than the high response button 1460. A low response button 1464 provides a lower response than the medium response button 1462. The difference between the different buttons 1460-1464 may be determined using a timer or the like as will be described below. Thus, a longer delay before the activation of one of the components of the heating and cooling module may be provided.

A slide dial response selector 1466 is another possible type of switch that may be provided. In this example, the slide dial 1468 may be selected by the vehicle occupant to provide the appropriate level of response. The slide dial 1468 has numerous positions and thus different inputs may be provided to the controller 1410 corresponding to a high position, a low position or anywhere in between. The portion of the user interface 1450 described above may be implemented as hard wire switches that are disposed on the vehicle or on the device itself. The user interface 1450 may also be implemented in a touch screen as will be described below.

The touch screen 1470 has various inputs including a comfort management button 1472. The comfort management button 1472 may initiate the activation and feedback for the comfort management system. Of course, other buttons may be provided on the user interface that corresponds to the vehicle conditions at button 1474, the entertainment system 1476, the navigation system 1478, and the mobile device interface 1480. The buttons 1472-1480 may be implemented as hard switches or as touch screen commands.

The controller 1410 includes response module 1411 that receives the desired response from the user interface and provides the signal or a time of delay to a comparison module 1412. A threshold module 1413 provides a threshold used by the comparison module 1412. The threshold module 1413 may receive a threshold from the user interface 1450 or the touch screen 1470. Thresholds may, for example, be determined by direct user input. The threshold module 1413 may, for example, be a desired temperature. The threshold 1413 may also take in consideration the humidity in and around the occupant, the ambient humidity, the air speed in and around the vehicle and the air speed in and around the occupant. The threshold 1413 may be adjusted by the response module 1411. For example, bands around the threshold may be provided that correspond to the desired response, wider bands correspond to lower responses. The system reacts when the bands are crossed rather than the specific temperature setting, for example, not being met. The bands may be set at percentages, five percent, 10 percent, 15 percent, may correspond to high response, medium response and low response, for example. The comparison module 1412 works in conjunction with a timer 1414 and a clock 1416. In another way to implement the response, the timer 1414 may time the change in the conditions and not provide a response until after a time period from the change in condition from the comparison module 1412 indicates a change. After the time period that a higher or lower response by the heating and cooling module 1490 is desired. The comparison module 1412 may thus provide a delay which may be increased or decreased by the occupant. The change of the response of the controller 1410 relative to the heating and cooling module 1490 is advantageous in that when very temporary conditions are experienced such as driving into a tunnel, driving in and out of the sun (wooded area) or other temporary cool or hot areas, the system does not overact.

The controller 1410 may also include a wire connector 1417 and/or a transceiver 1418. The wire connector 1417 communicates with various user interface or the touch screen display 1470 through a hard wire. A wired connector 1417 may also be used to communicate with the occupant condition sensor 1440. A transceiver 1418 may be used to wirelessly communicate with the display 1470, with the user interface 1450, and with the occupant condition sensor 1440. The transceiver transmits and receives data signals to and from the controller 1410.

The heating and cooling module 1490 may include a heater 1492, a cooler 1494 or a vent 1496. The heater 1492 may be implemented in various ways including heating elements used for heating air blowing through a duct. The cooler 1494 may provide cooling air by removing heat from the air within the duct of the system. The vent 1496 provides moving air without heating or cooling the air. The heater 1492 may also be implemented in a resistive wire within the device 1430 that heats. Any of the devices 1492-1496 may be also implemented using conduction provided power.

Referring now to FIG. 15, the occupant sensor 1440 is illustrated in a housing 1510. The housing 1510 may be located on the vehicle or within clothing of the occupant. For example, the temperature sensor 1442, the humidity sensor 1444, the air speed sensor 1446 and the heart rate sensor 1448 may be located in one housing 1510. Discrete sensors may also be provided. The housing 1510 may be removably coupled to clothing or to the occupant. For clothing, the sensors may be permanently attached on or within the clothing. A transceiver 1512 may be provided within the housing 1510 to communicate wirelessly to and from the controller 1510. More specifically, the transceiver 1512 may communicate with the transceiver 1418 illustrated in FIG. 14. Other examples of mounting the occupant sensors may include in a watch, mobile device or wearable device. Articles of clothing such as a glove, shoe, sock, undergarments, outerwear, base layers and the like.

A wire connector 1514 may also be provided through which a wire may be coupled by wire to the wire connector 1417 illustrated in FIG. 14.

As mentioned above, one or more housings 1510 having one or more of the occupant condition sensors may be provided. If more than one housing 1510 is provided, not all of the sensors 1442-1448 may be provided therein. Also, the housing 1510 may only include a single sensor. Either the temperature sensor 1442, the humidity sensor 1444, the air speed sensor 1446 or the heart rate sensor 1448 may be provided. However, more than one of the sensors may be provided within the housing or individually.

Referring now to FIGS. 16A-16I, a plurality of screen displays for controlling the device, such as the seat, is set forth. The screen displays correspond to ways in which to coordinate device, set various user setting and provide other data to the occupant.

Referring now specifically to FIG. 16A, the comfort management system may have an on button 1610 and an off button 1612 used to turn on and off the comfort management system displaced on the display 1470. The screen display 1608 may be reached after selection of the comfort management button 1472 illustrated in FIG. 14. The on button 1610 turns on the comfort management system and thus allows the user to enter a mode for providing various user settings. The off button 1612 turns the comfort management system off. If multiple devices for control are provided, individual control for the system may be provided.

Referring now to FIG. 16B, a screen display 1620 on the display 1470 may be reached once the comfort management system is turned "on" at the display 1610 above. The screen display 1470 may be used to select various components of the comfort management system to control. In one aspect, a feet button 1622 may be used to adjust the comfort control system, control a feet, a boot or lower extremity system. A hands button 1624 may be used to control the grips or gloves for an occupant. An upper body button 1626 may be used to control the temperature of the upper body or thorax of an occupant. The lower body button 1628 may be used to control the area around the hip section of the occupant. The head button 1630 may be used to control the temperature around the head, helmet or hat associated with an occupant. A seat button 1632 is used to control the heating, cooling, or ventilation of the seat of a vehicle.

Referring now to FIG. 16, a screen display 1640 is illustrated. In this example, a seat control having an up button 1642 and a down button 1644 are set forth. The center display 1646 is used to display a temperature. By selecting the up button, the temperature in the display 1646 changes. The temperature in the display 1646 corresponds to the desired temperature. The button 1644 reduces the temperature in the display 1646. Although a seat control is illustrated in the screen display 1640, a similar interface could be used for various other positions such as those illustrated in FIG. 16B.

Referring now to FIG. 16D, a screen display 1650 is set forth. The screen display 1650 allows manually selecting the heating portion of the heating and cooling module, the cooling portion of the heating and cooling module or the vent portion of the heating and cooling module. To this end, a heating button 1652 allows selection of the heating control of the heating and cooling module 1490. The cooling button 1654 allows the controlling of the cooler portion of the heating and cooling module 1490. Selecting the vent button 1656 allows the control of the vent of the heating and cooling module 1490.

The "auto" button 1658 is used to automatically select the desired operation. For example, the selection of the auto button 1658 will allows the system to change between heating and cooling to seek the desired temperature such the temperature set forth in the display 1646 above. By changing the response of the system described above, the system is prevented from rapidly and inefficiently changing between the heating, cooling and venting operations Referring now to FIG. 16E, the screen display 1660 is illustrated for increasing or decreasing the amount of heating, cooling or venting provided. The screen display 1660 may be generated after the selection of one of the heating, cooling or venting buttons 1652-1656 illustrated in FIG. 16D. In this example, a "minus" button 1662 and a "plus" button 1664 may be provided. Indicator 1666 may be displayed to illustrate the intensity of the amount of heating, cooling and venting provided. The screen display 1660 may display the word "heat" when heating is selected in screen display 1650, may display "cooling" when the cooling button 1654 is selected from the screen display 1650 or "venting" when the selector 1656 is selected in the screen display 1650.

Figure 16G:
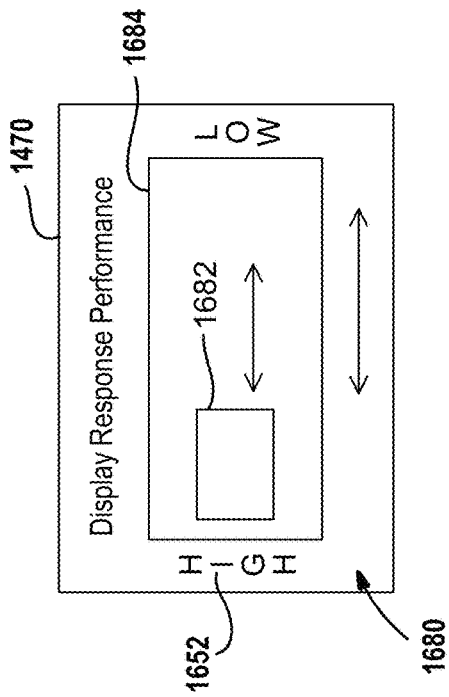
Figure 16I:
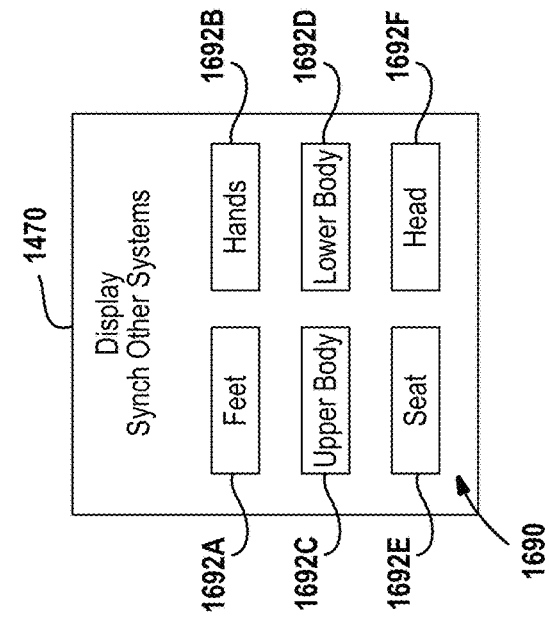
Figure 16F:
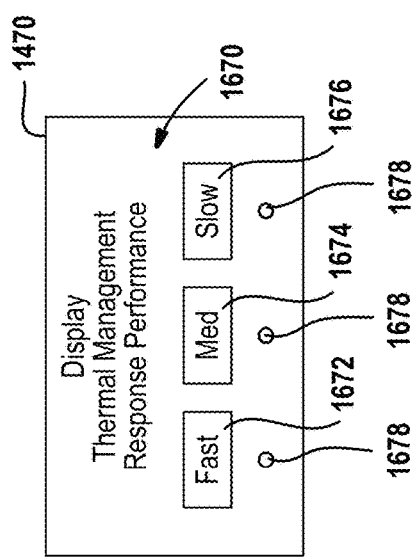

Referring now to FIG. 16F, a screen display 1670 is set forth. The screen display 1670 is used for selecting the response performance of the thermal management system. A fast response selector 1670, a medium response selector 1674 or a slow response selector 1676 may be activated to control the speed at which the heating and cooling module 1490 is commanded to response to the desired temperature. An indicator 1678 may be illuminated corresponding to which selector 1672-1676 have been selected. Other ways of conveying the selection are by highlighting or coloring differently the selectors 1670-1676 of the screen touch display 1470.

Referring now to FIG. 16G, a screen display 1680 is illustrated as an alternate way to control the response performance of the system. In this example, a button 1682 may be moved to the desired response within the box 1684. For example, by touching the screen closer to the "low" side of the box 1684, the button 1682 would be moved to the corresponding location of the touch on the touch screen.

Figure 16H:
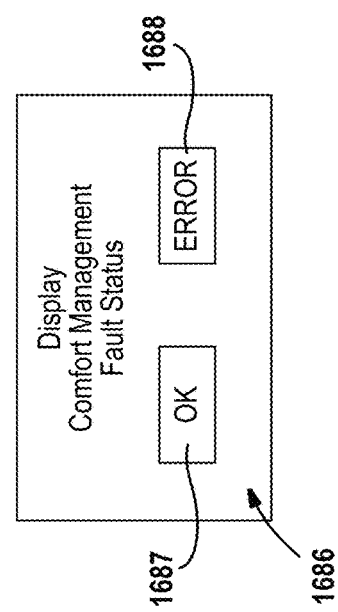

Referring now to FIG. 16H, a screen display 1686 is set forth for displaying a fault status of the system. In this example, an "okay" button 1687 and an "error" button 1688 are used for displaying either an okay status or an error status. The error status may be provided with an indication as to the source of the error or a numerical or alpha numerical code that corresponds to a particular fault. Warnings and instructions may also be provided within or adjacent to the error button 1688.

Referring now to FIG. 16I, a screen display 1690 present a synch screen for synching various systems within the vehicle. In this example, a seat button 1692A, a hand button 1692B, an upper body button 1692C, a lower body button 1692D, a seat button 1692D, and a head button 1692E may be selected to synch the comfort control system with other systems. For example, the feet and hands may be selected so that the temperatures and response performance are the same. By selecting or deselecting, the synchronization of various heating and cooling modules, an improved riding experience is generated. In the screen display 1690, synched systems may have the buttons 1692A-1692E highlighted, colored or otherwise changed to indicated that they have been synched.

Figure 17:
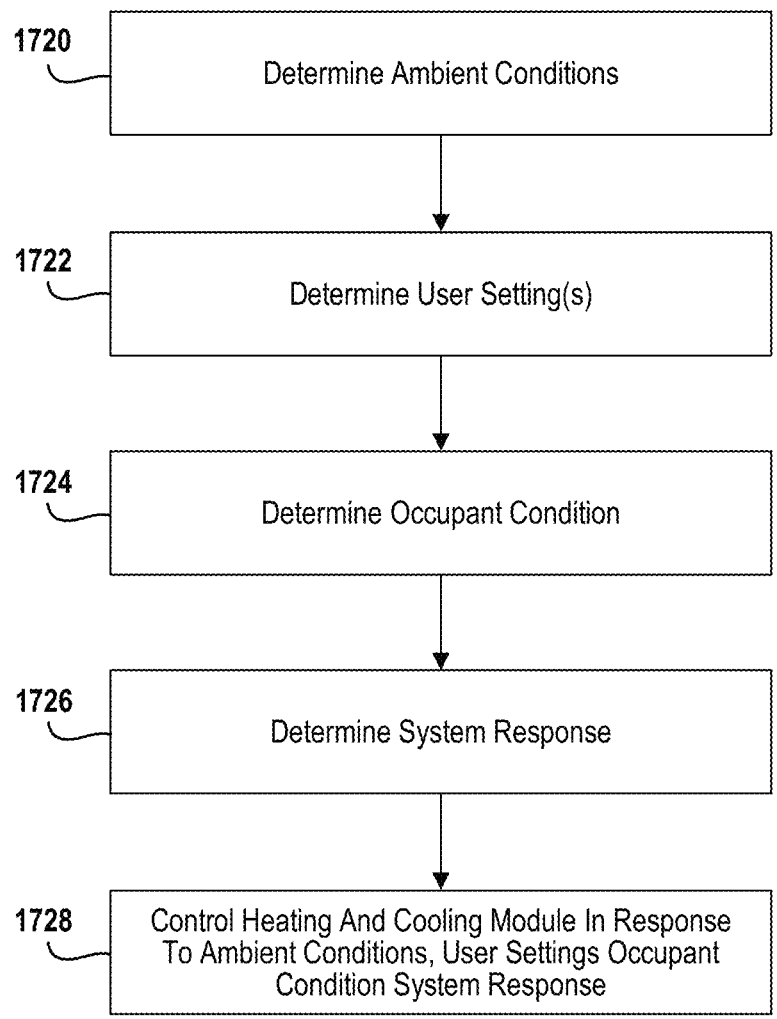
FIG. 17 is a simplified flowchart of a method for operating a comfort control system.

Referring now to FIG. 17, a high level method for controlling the heating and cooling module is set forth. In step 1720, the ambient conditions of the vehicle or around the user are determined. The sensors illustrated in FIG. 14 may be used. In step 1722, the user settings are determined. As mentioned, the user settings may be provided through a user interface generating user setting signals with user data. The user interface may be a discrete switch or a touch screen. The settings may indicated how much heating, cooling or ventilation is desired. The settings may also indicate a desired temperature or humidity. In step 1724, the occupant conditions are determined. This is an optional set if the occupant conditions are to be taken into account for controlling the heating and cooling module. The occupant conditions may be determined from sensors provided within or on clothing such as boots or shoes, pants, jackets, shirts, helmets or the like.

In step 1726, the desired response of the system is determined by the user settings. As mentioned above, the response of the system corresponds to how quickly the occupant would like the system to change in order to try to meet the desired or target temperature or humidity. For example, when the user would not like to feel humidity (sweaty), the venting system or cooling system may be increased to drive the user.

In step 1728, the heating and controlling module is controlled in response to the ambient conditions, the user settings, the occupant conditions and the system response. With respect to temperature, if the temperature is not high enough, heating is provided. If the temperature is too high, heating may be turned off. Likewise, should excess moisture be detected, ventilation or cooling may be provided. Also, as the ambient temperature changes, the amount of heating and the amount of cooling may be increased or decreased to maintain the occupant at a desired level of comfort.

Figure 18:
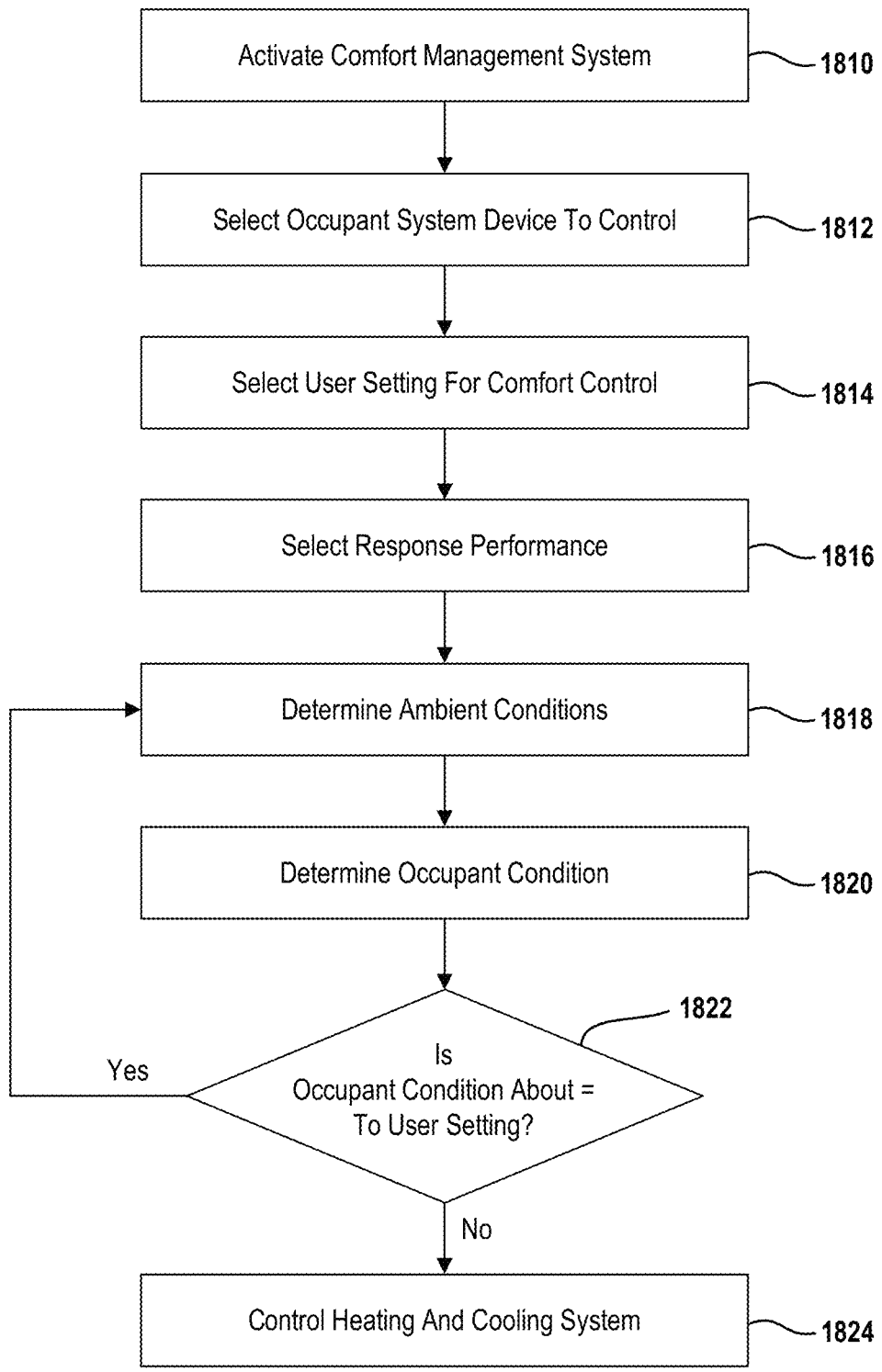
FIG. 18 is a detailed flowchart of the method for operating the comfort control system.

Referring now to FIG. 18, the overall operation of the system is set forth. In step 1810, the comfort management system is activated. As mentioned above, this may take place using discrete switches or a touch screen such as in the Polaris© Ride Command® System. In step 1812, the occupant system to control is selected. In some vehicles, only the seats may be able to be controlled. Therefore, step 1812 need not be performed when only a single comfort system is provided. In step 1814, the user settings are provided for the comfort control system. User settings may, for example, provide a desired temperature. In step 1816, the response performance is also selected by the user. In some systems, a response performance may not be provided. As mentioned above, the response is how quickly the system is controlled to obtain the desired user settings. In step 1818, the ambient conditions around the occupant is determined. These step may be performed for one occupant or may be performed individually for any number of occupants within the vehicle. The ambient conditions may include the temperature, the wind speed, the amount of sunlight and the humidity. When the vehicle is traveling a high rate of speed, for example, the driver may experience "wind chill". The effect is less as the vehicle slows.

Should the occupant have individual occupant condition sensors, the occupant conditions are sensed and provided to the controller. As mentioned above, in certain conditions, the clothing of the occupant may have sensors therein. The sensors provide feedback to the controller so that adequate changes may be made to the heating and cooling module. In step 1822, the occupant condition is compared to the user settings. When the occupant conditions are the same or about the same as the user settings, steps 1818 and 1820 are performed. The word "about" in used in step 1822 to indicate the amount of response. When the temperature, for example, is within a certain range of the desired temperature, a change in the amount of heating or cooling provided by the heating or cooling module may not be adjusted. This is part of the response of the system.

In step 1822, when the occupant condition is not equal to the user setting or outside the range around the user setting, the heating and cooling system is operated to seek the desired user setting in step 1824.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method, comprising:
   receiving, by a controller, user input indicating a temperature setting;
   receiving sensor information from at least one sensor including a radio frequency receiver;
      wherein the at least one sensor includes at least one body temperature sensor;
      wherein the sensor information includes information indicating a body temperature of a user;
   determining, based on the temperature setting and the sensor information, an amount of current to provide to a first energy transfer device, wherein the first energy transfer device is coupled to a frame of a recreational vehicle; and
   providing, based on the amount of current and by the controller, a current to the first energy transfer device, wherein the first energy transfer device is configured to wirelessly provide power to a second energy transfer device;
      wherein the second energy transfer device is configured to provide the power to a load.

2. The method of claim 1, wherein determining the amount of current to provide to the first energy transfer device includes:
   increasing the amount of current to provide to the first energy transfer device in response to the body temperature of the user being less than a temperature corresponding to the temperature setting.

3. The method of claim 1, wherein determining the amount of current to provide to the first energy transfer device further includes:
   decreasing the amount of current to provide to the first energy transfer device in response to the body temperature of the user being greater than a temperature corresponding to the temperature setting.

4. The method of claim 1, wherein the load includes an article worn by the user;
   wherein the load includes a heating, cooling, or ventilation element corresponding to the article;
   wherein the second energy transfer device is coupled to the article and second transfer device is configured to provide a second current to the heating, cooling, or ventilation element to the article.

5. The method of claim 1, wherein the first energy transfer device is coupled with a steering assembly of the recreational vehicle.

6. The method of claim 1, wherein the controller is a component of a user input device and the user input device is operatively coupled with the frame.

7. The method of claim 6, wherein the user input device includes at least one of an analog temperature selector, a touch screen, or a digital input device.

8. The method of claim 1, including providing sensor information a user input device.

9. The method of claim 1, including receiving, by the controller, sensor information from an ambient condition sensor.

10. The method of claim 1, including receiving, by the controller, sensor information from a plurality of sensors;
wherein the plurality of sensors includes one or more of an ambient temperature sensor, a vehicle speed sensor, or an energy source sensor.

11. The method of claim 1, wherein the load includes a plurality of body temperature sensors positioned along desired locations of the load.

12. The method of claim 1, including providing a body temperature reading to the controller transmitted from the radio frequency receiver.

13. The method of claim 1, including determining, based on at least one of the user input or the sensor information, an amount of voltage to provide to the first energy transfer device.

14. The method of claim 1, including determining, based on a location of the load the amount of current to the first energy transfer device.

15. The method of claim 1, including providing the amount of current or an amount of voltage to the first energy transfer device based on a speed of the recreational vehicle.

16. The method of claim 1, including increasing the amount of current provided to the first energy transfer device when a speed of the recreational vehicle increases.

17. The method of claim 1, including comparing, with the controller, the sensor information related to the body temperature of the user with the user input indicating the temperature setting.

18. The method of claim 1, wherein the load includes a maximum temperature switch between the load and the second energy transfer device;
the method including monitoring with the maximum temperature switch a temperature of the load.

19. The method of claim 18, including opening a circuit load by the maximum temperature switch when the maximum temperature switch detects a temperature greater than a threshold temperature.

20. The method of claim 1, including receiving from the user input one or more temperature settings that correspond to one or more loads;
wherein the one or more loads includes a helmet, shirt, pants, gloves, and outerwear.

* * * * *